Figure 1:
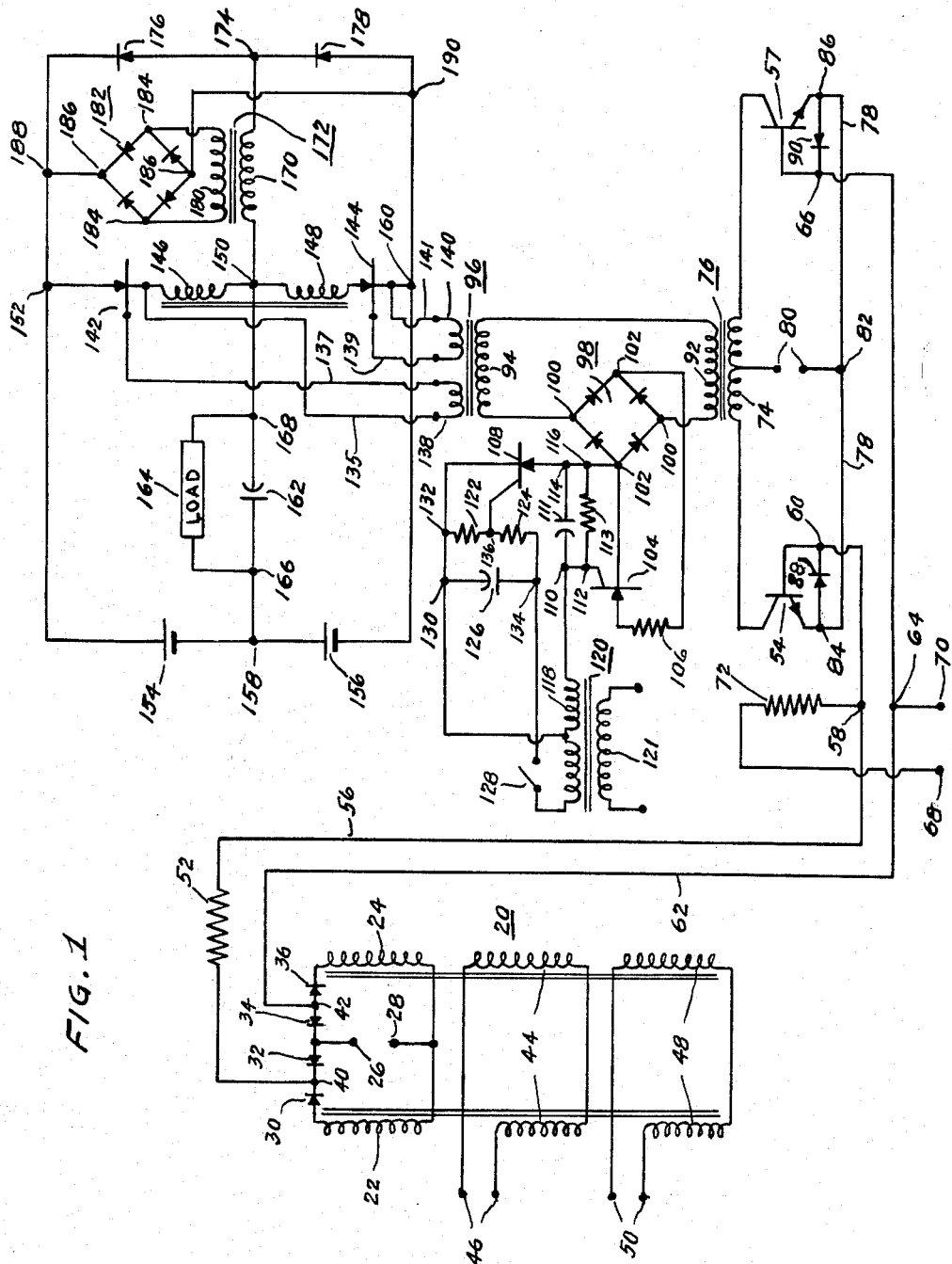

INVENTOR.
OWEN E. REINERT
BY
Rey Eilers
ATT'Y.

April 28, 1964 O. E. REINERT 3,131,343
CONTROL SYSTEMS WHEREBY THE D.C. OUTPUT VOLTAGE CAN BE
CONTROLLED BETWEEN ITS MAXIMUM POSITIVE
AND NEGATIVE VALUES
Filed July 24, 1961
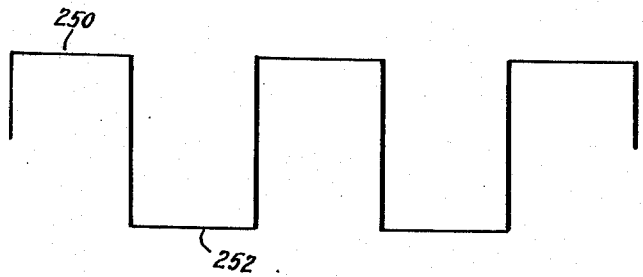
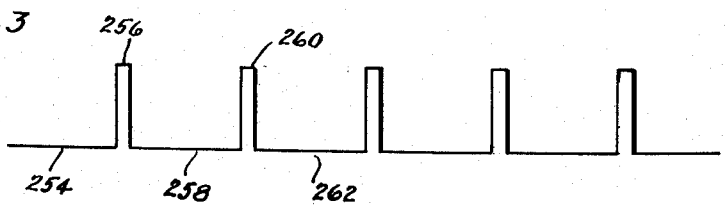
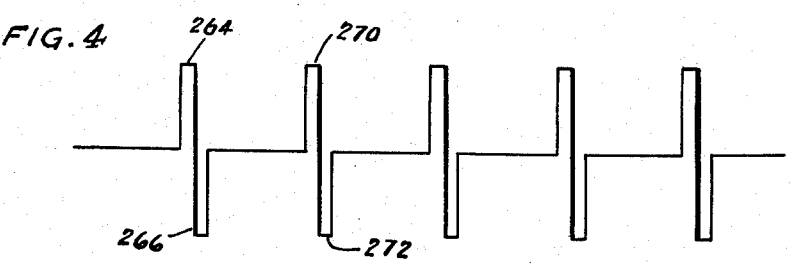
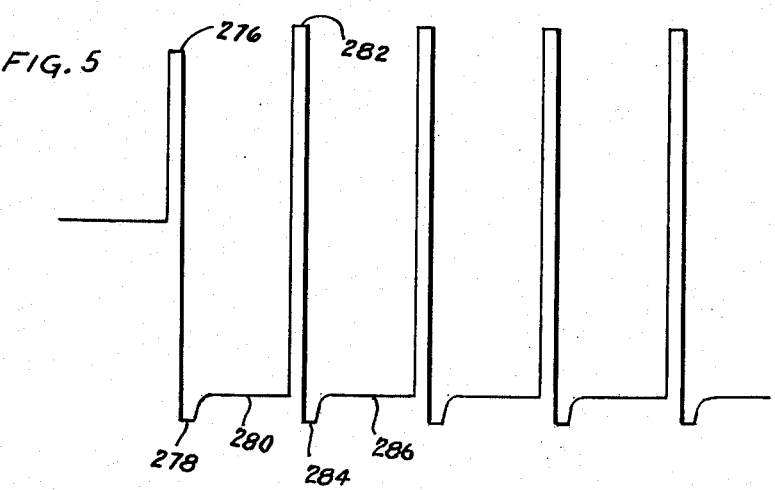
INVENTOR.
OWEN E. REINERT
BY
Rey Eilers
ATT'Y.

April 28, 1964  O. E. REINERT  3,131,343
CONTROL SYSTEMS WHEREBY THE D.C. OUTPUT VOLTAGE CAN BE
CONTROLLED BETWEEN ITS MAXIMUM POSITIVE
AND NEGATIVE VALUES Filed July 24, 1961  6 Sheets—Sheet 3

INVENTOR.
OWEN E. REINERT
BY
Rey Eilers
ATT'Y.

April 28, 1964  O. E. REINERT  3,131,343
CONTROL SYSTEMS WHEREBY THE D.C. OUTPUT VOLTAGE CAN BE
CONTROLLED BETWEEN ITS MAXIMUM POSITIVE
AND NEGATIVE VALUES
Filed July 24, 1961  6 Sheets-Sheet 4

INVENTOR.
OWEN E. REINERT
BY
Ray Eilers
ATT'Y.

INVENTOR.
OWEN E. REINERT

INVENTOR.
OWEN E. REINERT

United States Patent Office 3,131,343
Patented Apr. 28, 1964

3,131,343
CONTROL SYSTEMS WHEREBY THE D.C. OUTPUT VOLTAGE CAN BE CONTROLLED BETWEEN ITS MAXIMUM POSITIVE AND NEGATIVE VALUES
Owen E. Reinert, St. Louis County, Mo., assignor to Sperry Rand Corporation, a corporation of Delaware
Filed July 24, 1961, Ser. No. 126,038
21 Claims. (Cl. 321—16)

This invention relates to improvements in control systems. More particularly, this invention relates to improvements in control systems which can provide an essentially D.C. output that is controllable at any point between its maximum positive value and its maximum negative value.

It is, therefore, an object of the present invention to provide a control system which can provide an essentially D.C. output that is controllable at any point between its maximum positive and maximum negative values.

It is sometimes desirable to supply a load with an essentially D.C. input that can be controlled at any point between its maximum positive value and its maximum negative value. Where such an input is supplied to a load, many different values of essentially D.C. negative input can be supplied to that load, zero input can be supplied to that load, and many different values of essentially D.C. positive input can be supplied to that load. Further, the various different values of essentially D.C. negative input and the various different values of essentially D.C. positive input that are supplied to that load can be closely controlled. As a result, a highly desirable and highly precise control of that load can be attained. The present invention provides a control system that can provide different values of essentially D.C. negative output, can supply zero output, and can supply different values of essentially D.C. positive output; and it can provide precise control of those different values of essentially D.C. output. It is, therefore, an object of the present invention to provide a control system which can provide and can precisely control different values of essentially D.C. negative output, can provide zero output, and can provide and can precisely control different values of essentially D.C. positive output.

The control system provided by the present invention provides an output wave-form with alternating positive-going components and negative-going components, and it obtains the desired net polarity of that wave-form by varying the dwell times of the alternating components of that wave-form. Specifically, where maximum positive output is desired, that control system will make the dwell times of the positive-going components of the output wave-form as long as possible and will make the dwell times of negative-going components of that wave-form as short as possible. Conversely, where maximum negative output is desired, that control system will make the dwell times of the negative-going components of the output wave-form as long as possible and will make the dwell times of the positive-going components of that wave-form as short as possible. Where zero output is desired, that control system will make the dwell times of the positive-going and negative-going components of the output wave-form equal. Further, where positive outputs smaller than the maximum positive outputs are desired, that control system will make the dwell times of the positive-going components of the output wave-form longer than the dwell times of the negative-going components of the output wave-form but shorter than the maximum attainable dwell times for those positive-going components. Conversely, where negative outputs smaller than the maximum negative outputs are desired, that control system will make the dwell times of the negative-going components of the output wave-form longer than the dwell times of the positive-going components of the output wave-form but shorter than the maximum attainable dwell times for those negative-going components. In this way, the control system provided by the present invention can provide a maximum positive output, a maximum negative output, and any desired positive or negative outputs intermediate that maximum positive output and that maximum negative output. It is, therefore, an object of the present invention to provide a control system which can vary the dwell times of the alternating, positive-going and negative-going components of an output wave-form to provide different values of essentially D.C. positive output, to provide zero output, and to provide different values of essentially D.C. negative output.

The control system provided by the present invention utilizes control elements that can be rendered conductive and that can be rendered non-conductive; and that control system utilizes at least one of those control elements to provide the positive-going components of its output wave-form and utilizes at least a second of those control elements to provide the negative-going components of that wave-form. That control system can vary the length of time during which the one control element is rendered conductive to vary the percentage of positive-going components in that output wave-form, and can vary the length of time during which the second control element is rendered conductive to vary the percentage of negative-going components in that output wave-form. Controlled rectifiers are particularly desirable control elements for use in the control system provided by the present invention. It is, therefore, an object of the present invention to provide a control system which utilizes at least one control element, such as a controlled rectifier, to provide the positive-going components of its output wave-form and utilizes at least a second control element, such as a controlled rectifier, to provide the negative-going components of that wave-form, and which can vary the length of time during which the one control element is rendered conductive to vary the percentage of positive-going components in that output wave-form, and can vary the length of time during which the second control element is rendered conductive to vary the percentage of negative-going components in that output wave-form.

The control system provided by the present invention does not normally permit all of the control elements thereof to be conductive at the same time. Instead, that control system makes sure that the second control element will normally be non-conductive when the said one control element is conductive; and that control system makes sure that the said one control element will normally be non-conductive when the said second control element is conductive. That control system utilizes the charge on a capacitor thereof to render the said one control element non-conductive whenever the said second control element is rendered conductive; and that control system subsequently utilizes an oppositely polarized charge on that capacitor to render the said second control element non-conductive whenever the said one control element again becomes conductive. It is essential that the capacitor be sufficiently charged, during each alternation of the output wave-form of that control system, to enable the charge on the said capacitor to render the previously-conductive control element non-conductive. The control system provided by the present invention makes sure that the said capacitor will become sufficiently charged, during each alternation of the output wave-form of that control system, to enable the charge on the said capacitor to render the previously-conductive control element non-conductive, by providing a minimum dwell time, for each alternation of that output wave-form, which is long enough to assure sufficient charging of that capacitor. Further, that control system makes sure that the said capacitor will become sufficiently charged, during each alternation of the output wave-form of that control system, to enable the charge on the said capacitor to render the previously-conductive control element non-conductive, by providing a "hold out" circuit which will prevent the rendering of any of the control elements conductive, for less than one full alternation, whenever the control system is turned "on." It is, therefore, an object of the present invention to provide a control system which utilizes the charge on a capacitor to render a previously-conductive control element non-conductive, and which makes certain that the capacitor will be sufficiently charged, during each alternation of the output wave-form of that control system, to enable the charge on the said capacitor to render the previously-conductive control element non-conductive.

The control system provided by the present invention is capable, when used with highly inductive loads, of providing unidirectional current flow through those loads even through the control elements of that control system provide alternating positive-going and negative-going wave-form components. This means that the control system provided by the present invention is able to provide selectively variable dwell times for alternating positive-going and negative-going wave-form components, and yet is also able to provide unidirectional current flow through some loads. This is a desirable result; and it is, therefore, an object of the present invention to provide a control system which is able to provide selectively variable dwell times for alternating positive-going and negative-going wave-form components, and yet is also able to provide unidirectional current flow through some loads.

The control system provided by the present invention draws energy from a source of energy and temporarily stores that energy in the inductive and capacitive components of that control system; and that control system then uses part of that stored energy to render the previously-conductive control element non-conductive. Thereafter, that control system "pumps" the rest of that temporarily stored energy back into the said source of energy. This is desirable because it makes it possible for the control system to store enough energy in those inductive and capacitive components, during even the shortest duration alternations, to promptly render the previously-conductive control element non-conductive, and yet makes it possible for that control system to avoid wasting the larger amounts of energy that will be stored in those inductive and capacitive components during longer alternations. It is, therefore, an object of the present invention to provide a control system that draws energy from a source of energy, that temporarily stores that energy in the inductive and capacitive components of that control system, than then uses part of that stored energy to render the previously-conductive control element non-conductive, and then subsequently "pumps" the rest of that temporarily stored energy back into the said source of energy.

Other and further objects and advantages of the present invention should become apparent from an examination of the drawing and accompanying description.

In the drawing and accompanying description, two preferred embodiments of the present invention are shown and described, but it is to be understood that the drawing and accompanying description are for the purpose of illustration only and do not limit the invention and that the invention will be defined by the appended claims.

Figure 6:
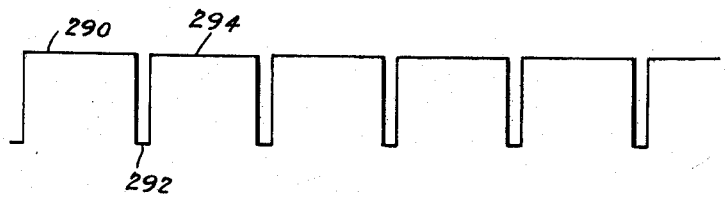
Figure 7:
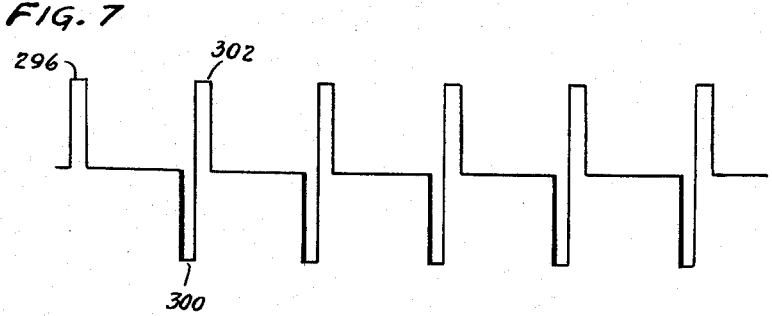
Figure 8:
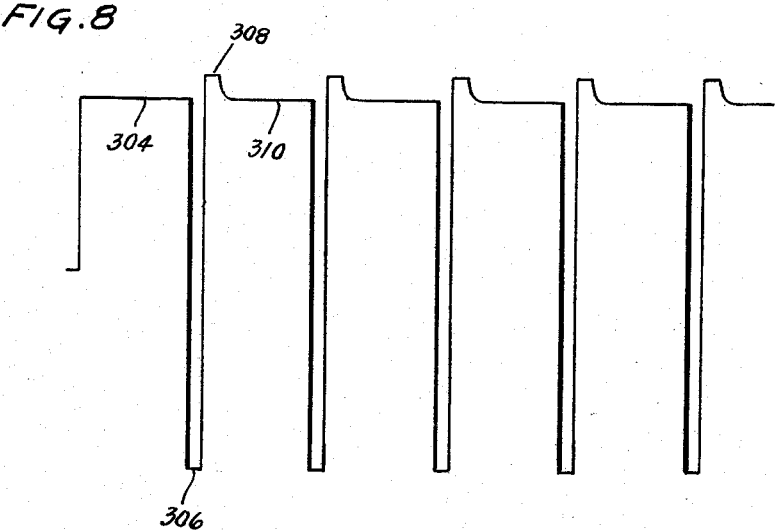
Figure 9:
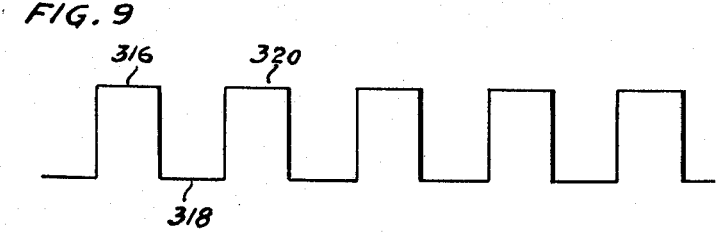
Figure 10:
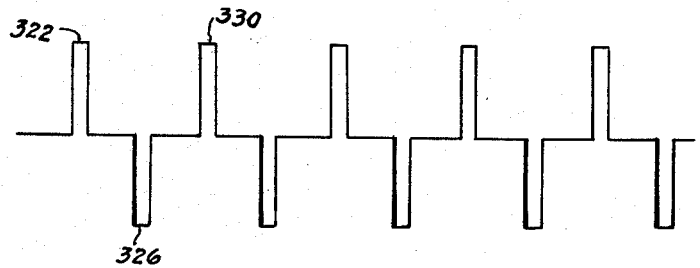
Figure 11:
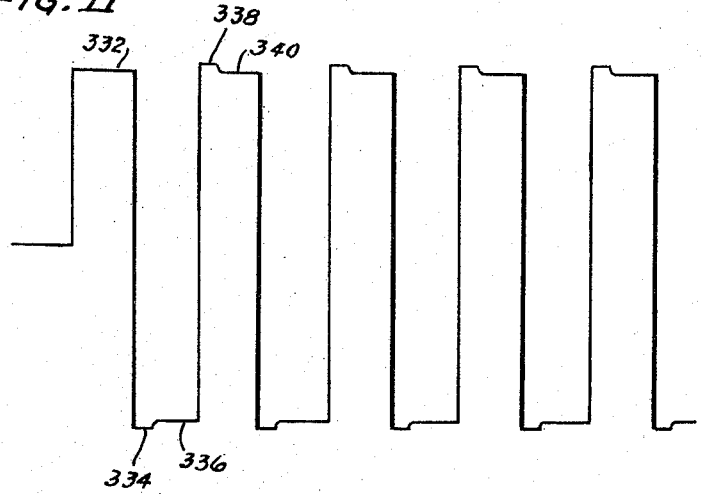
Figure 12:
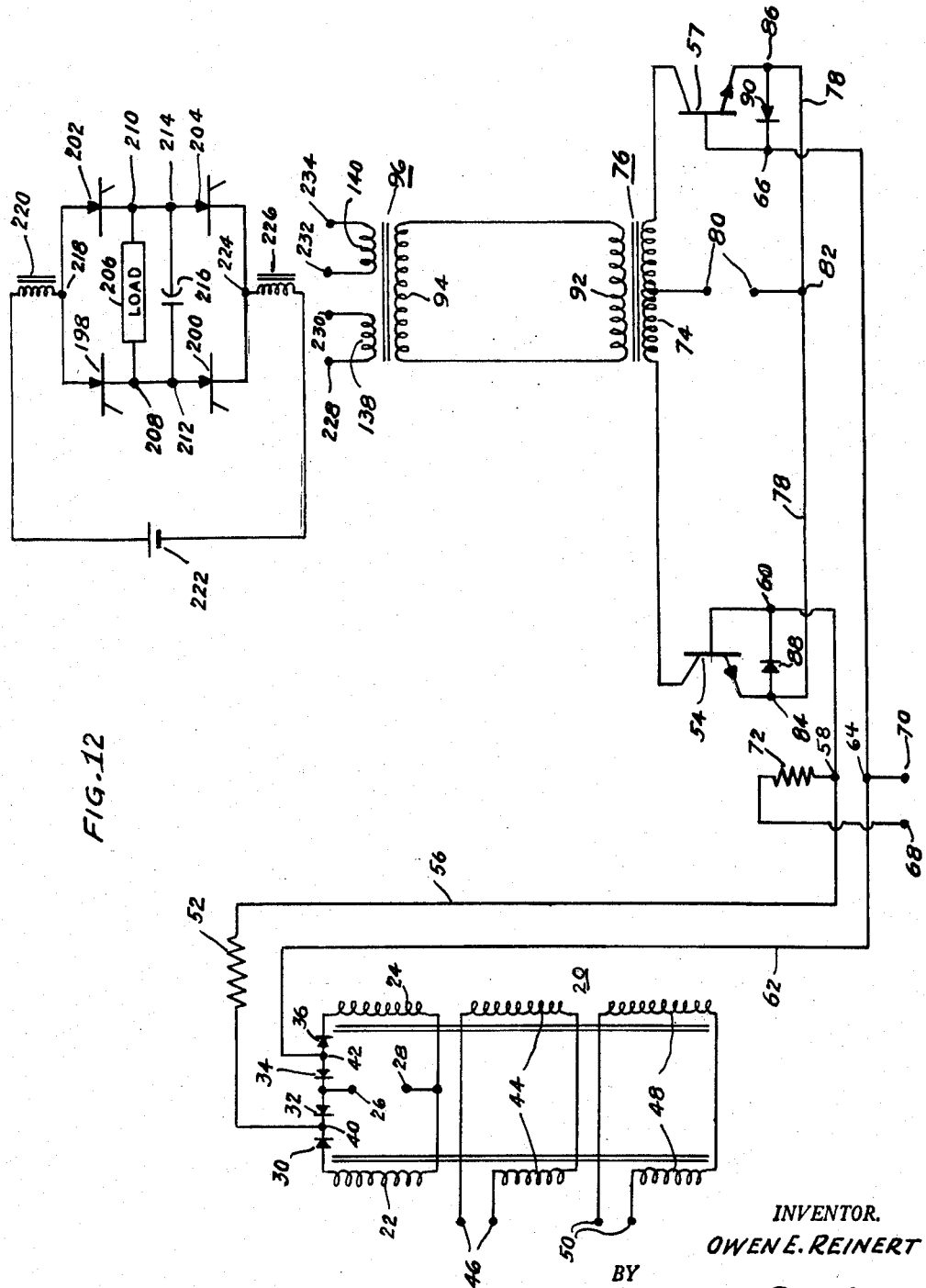
Figure 13:
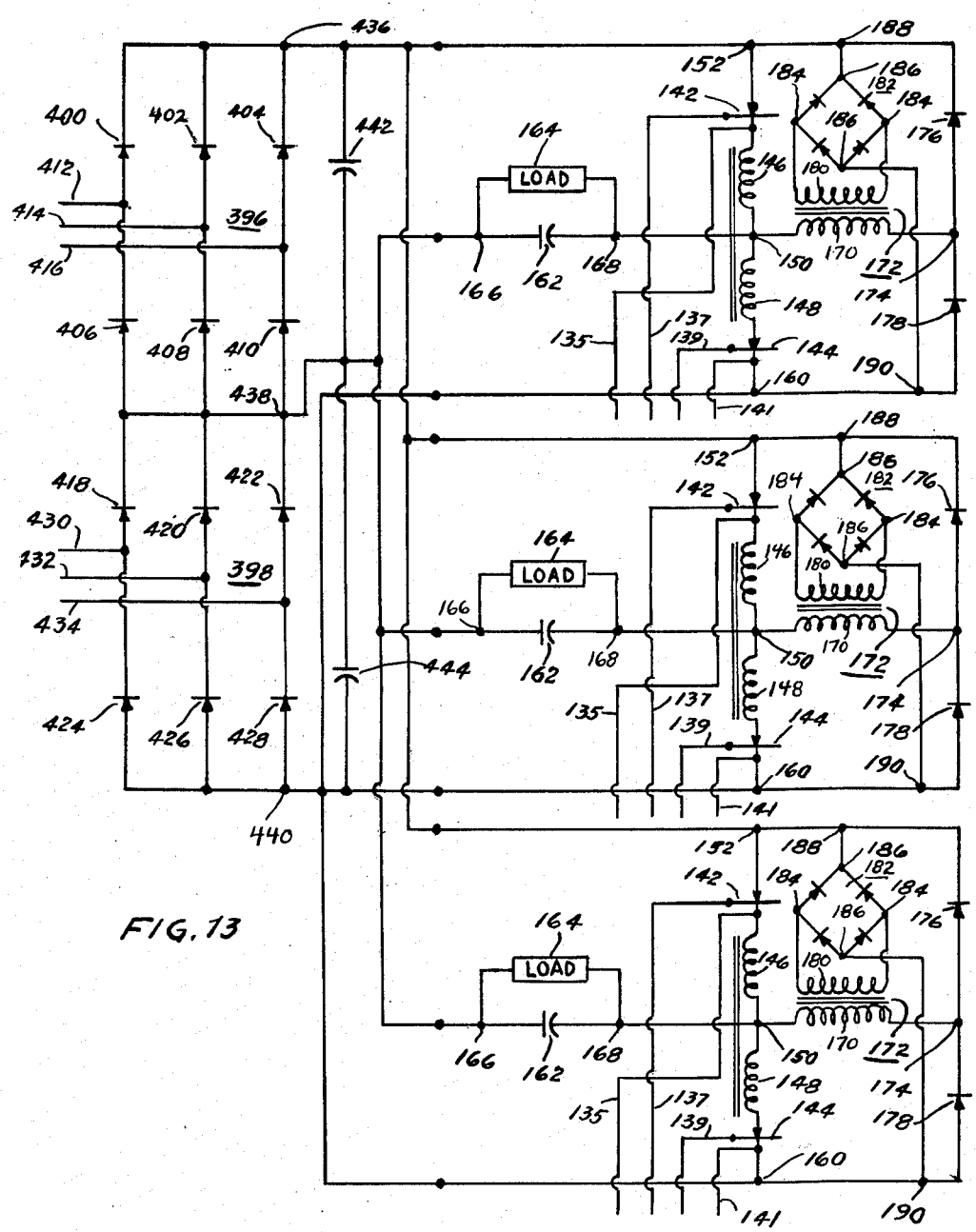

In the drawing, FIG. 1 is a schematic diagram of one preferred embodiment of control system that is made in accordance with the principles and teachings of the present invention, FIG. 2 is a view of a square wave-form which is supplied to the input terminals of the output winding of the magnetic amplifier of the control system of FIG. 1, FIG. 3 is a view showing pulses that can be supplied by the output winding of the magnetic amplifier of the control system of FIG. 1, FIG. 4 is a view showing pulses which can be applied to the gates of the controlled rectifiers of the control system of FIG. 1, FIG. 5 is a view showing one of the essentially D.C. negative voltage output wave-forms that can be provided by the control system of FIG. 1, FIG. 6 is a view showing other pulses that can be supplied by the output winding of the magnetic amplifier of the control system of FIG. 1, FIG. 7 is a view showing other pulses which can be applied to the gates of the controlled rectifiers of the control system of FIG. 1, FIG. 8 is a view showing one of the essentially D.C. positive voltage output wave-forms that can be provided by the control system of FIG. 1, FIG. 9 is a view showing still other pulses supplied by the output winding of the magnetic amplifier of the control system of FIG. 1, FIG. 10 is a view showing still other pulses applied to the gates of the controlled rectifiers of the control system of FIG. 1, FIG. 11 is a view showing the essentially D.C. zero voltage output wave-form that can be provided by the control system of FIG. 1, FIG. 12 is a schematic diagram of another preferred embodiment of control system that is made in accordance with the principles and teaching of the present invention, and FIG. 13 is a schematic diagram of three of the control systems of FIG. 1 and of two bridge rectifiers to which all of those control systems are connected.

Referring to the drawing in detail, the numeral 20 generally denotes a magnetic amplifier which has an output winding with two sections 22 and 24; and the lower terminals of those two sections are connected together and are connected to an input terminal 28. The upper terminal of the section 22 of the output winding is connected to the anode of a diode 30, and the cathode of that diode is connected to the output terminal 40 of the magnetic amplifier 20. A diode 32 has the cathode thereof connected to the output terminal 40; and the anode of that diode is connected to the input terminal 26. A diode 34 has the cathode thereof connected to the input terminal 26; and the anode of that diode is connected to the ouput terminal 42 of the magnetic amplifier 20. A diode 36 has the anode thereof connected to the output terminal 42; and the cathode of that diode is connected to the upper terminal of section 24 of the output winding.

The numeral 44 denotes the control winding of the magnetic amplifier 20, and the terminals of that winding are denoted by the numeral 46. Those terminals will be connected to a suitable source of variable direct current.

The numeral 48 denotes the bias winding of the magnetic amplifier 20, and the terminals of that winding are denoted by the numeral 50. Those terminals will be connected to a suitable source of adjustable direct current.

The input terminals 26 and 28 of the output winding of the magnetic amplifier 20 will be connected to a suitable source of A. C. voltage. That source of A.C. voltage will supply a signal that has a frequency which is preferably less than four thousand cycles per second; and that source of A. C. voltage will preferably supply a signal with a square wave-form of the type shown by FIG. 2. In one preferred embodiment of control system that was made in accordance with the principles and teachings of the present invention, the said source of A.C. voltage supplied a two hundred cycle per second signal with the square wave-form shown by FIG. 2.

The numeral 54 denotes a transistor which is adjacent the central portion of the bottom of FIG. 1; and the base of that transistor is connected to the output terminal 40 of the magnetic amplifier 20 by a resistor 52, a conductor 56, a junction 58, and a junction 60. The numeral 57 denotes a transistor which is disposed to the right of the transistor 54; and a conductor 62, a junction 64, and a junction 66 connect the output terminal 42 of the magnetic amplifier 20 to the base of the transistor 57.

A terminal 70 is directly connected to the junction 64, and a terminal 68 is connected to the junction 58 by a resistor 72. The terminals 68 and 70 will be connected to a suitable source of fixed D.C. voltage.

The numeral 74 denotes the center-tapped primary winding of a transformer 76; and the left-hand section of that winding is connected to the collector of the transistor 54 while the right-hand section of that winding is connected to the collector of the transistor 57. The center tap of the primary winding 74 is connected to the upper of a pair of terminals 80; and the lower terminal 80 is connected to the emitter of the transistor 54 by a junction 82, a conductor 78, and a junction 84 while the lower terminal is connected to the emitter of the transistor 57 by the junction 82, the conductor 78, and a junction 86. The terminals 80 will be connected to a suitable source of fixed D.C. voltage; and the positive terminal of that source of D.C. voltage will be connected to the upper terminal 80 while the negative terminal of that source of D.C. voltage will be connected to the lower terminal 80. A diode 88 is connected between the junctions 84 and 60, and it has the anode thereof connected to the junction 84. A diode 90 is connected to the junctions 66 and 86, and it has the anode thereof connected to the junction 86.

The secondary winding of the transformer 76 is denoted by the numeral 92; and the right-hand terminal of that winding is connected to the right-hand terminal of the primary winding 94 of a transformer 96. The left-hand terminal of the secondary winding 92 is connected to the lower input terminal 100 of a bridge rectifier 98. The upper input terminal 100 of that bridge rectifier is connected to the left-hand terminal of the primary winding 94 of the transformer 96. The left-hand output terminal 102 of the bridge rectifier 98 is connected to the cathode of a controlled rectifier 104, and the right-hand output terminal 102 of the bridge rectifier 98 is connected to the anode of that controlled rectifier by a resistor 106. Junctions 110, 112, 114 and 116 connect a capacitor 111 between the gate and the cathode of the controlled rectifier 104; and the junctions 112 and 116 connect a resistor 113 in parallel with the capacitor 111.

The left-hand terminal of the capacitor 111 is connected to the right-hand section of a center-tapped secondary winding 118 of a transformer 120 by the junction 110. The right-hand terminal of that capacitor is connected to the anode of a controlled rectifier 108 by the junction 114; and the cathode of that controlled rectifier is connected to the center tap of the secondary winding 118 by junctions 132 and 130. A junction 136, a resistor 124, a junction 134, and a single pole single throw switch 128 can selectively connect the left-hand section of the secondary winding 118 to the gate of the controlled rectifier 108. A resistor 122 extends between the junction 136 and the junction 132; and a capacitor 126 is connected to the junctions 134 and 130. The primary winding of the transformer 120 is denoted by the numeral 121; and its terminals will be connected to the same source of A.C. voltage to which the input terminals 26 and 28 of the output winding of the magnetic amplifier 20 are connected.

The transformer 96 has a secondary winding 138 and has a secondary winding 140. The left-hand terminal of secondary winding 138 is connected to the gate of a controlled rectifier 142 by a conductor 135 while the right-hand terminal of that secondary winding is connected to the cathode of that controlled rectifier by a conductor 137. The left-hand terminal of secondary winding 140 is connected to the gate of a controlled rectifier 144 by a conductor 139 while the right-hand terminal of that secondary winding is connected to the cathode of that controlled rectifier by a conductor 141. The cathode of controlled rectifier 142 is connected to the anode of the controlled rectifier 144 by inductors 146 and 148 which have the adjacent terminals thereof secured to a junction 150. While two separate inductors that are wound on the same core are shown, a center-tapped inductor could be used.

The anode of the controlled rectifier 142 is connected to the positive terminal of a D.C. power source 154 by a junction 152; and the cathode of the controlled rectifier 144 is connected to the negative terminal of a second D.C. power source 156 by a junction 160. The negative terminal of the D.C. power source 154 is connected to the positive terminal of the D.C. power source 156 by junction 158. A load 164 is connected to the junction 158 by a junction 166 and is connected to the junction 150 by a junction 168. A capacitor 162 is connected to the junctions 166 and 168 and is thus connected in parallel with the load 164.

The primary winding 170 of a transformer 172 has the left-hand terminal thereof connected to the junction 150, and has the right-hand terminal thereof connected to a junction 174. A diode 176 has the anode thereof connected to the junction 174, and has the cathode thereof connected to the junction 152 by a junction 188. A diode 178 has the cathode thereof connected to the junction 174, and has the anode thereof connected to the junction 160 by a junction 190. The secondary winding of the transformer 172 is denoted by the numeral 180; and the terminals of that winding are connected to the input terminals 184 of a bridge rectifier 182. The upper output terminal 186 of that bridge rectifier is connected to the positive terminal of the D.C. power source 154 by the junctions 188 and 152, and the lower output terminal 186 of that bridge rectifier is connected to the negative terminal of the D.C. power source 156 by the junctions 190 and 160.

The D.C. power sources 154 and 156 are shown as batteries; but other types of D.C. power sources could be used. For example, D.C. generators could be used or A.C. generators with rectified outputs could be used. Where the D.C. power sources, which are used, are incapable of accepting energy from the inductors 146 and 148, of temporarily holding that energy, and of subsequently returning that energy to those inductors, a capacitor should be connected across the output of each D.C. power source to accept energy from the inductors, to temporarily hold that energy, and to subsequently return that energy to those inductors.

In the operation of the control system of FIG. 1, the adjustable D.C. current source connected to the terminals 50 of the bias winding 48 of the magnetic amplifier 20 will cause sufficient bias current to flow through that winding to provide a desirable quiescent output for that magnetic amplifier. That quiescent output will be selected so the pulse or signal which is provided by the output winding of the magnetic amplifier 20, during each half cycle of the A.C. voltage which is applied to the input terminals 26 and 28, can not be initiated until more than twelve microseconds have elapsed after the beginning of each said half cycle, and so each said pulse or signal will be initiated more than twelve microseconds before the end of each said half cycle of that A.C. voltage. Where that is done, the control system provided by the present invention will always provide enough time to render the previously-conductive control elements non-conductive whenever those control elements should be rendered non-conductive.

The D.C. voltage source which is connected to the terminals 68 and 70 will cause current to flow from terminal 70 past junctions 64 and 66, through the base-emitter circuit of the transistor 57, past junctions 86, 82 and 84, through diode 88, past junctions 60 and 58, and through resistor 72 to the terminal 68. That flow of current will render the transistor 57 conductive and will render the transistor 54 non-conductive.

The D.C. voltage source connected to the terminals 80 will apply a positive voltage to the collectors of the transistors 54 and 57, and will apply a negative voltage to the emitters of those transistors. As a result, the transistor 57 will normally be conducting current and will normally cause current to flow through the right-hand section of the center-tapped primary winding 74.

The D.C. voltage source 154 will apply a positive voltage to the anode of the controlled rectifier 152 and will apply a negative voltage to the cathode of that controlled rectifier; but that controlled rectifier will be non-conductive because no signals have been applied to the gate thereof. The D.C. voltage source 156 will apply a positive voltage to the anode of the controlled rectifier 144 and will apply a negative voltage to the cathode of that controlled rectifier; but that controlled rectifier will be non-conductive because no signals have been applied to the gate thereof.

The source of variable D.C. current, which is connected to the terminals 46 of the control winding 44 of the magnetic amplifier 20, will be adjusted to enable the square wave A.C. signal, that is to be applied to the input terminals 26 and 28 of that magnetic amplifier, to cause current to flow from the output terminals 40 and 42 of that magnetic amplifier. The adjustment of that source of variable D.C. current can be such that current will begin to flow from those output terminals some twelve microseconds or so after the initiation of any given half cycle of that square wave A.C. signal, the adjustment of that source of variable D.C. current can be such that current will not begin to flow from those output terminals until shortly before the end of that given half cycle of that square wave A.C. signal, or the adjustment of that source of variable D.C. current can be such that current will begin to flow from those output terminals at various other times during that half cycle of that square wave A.C. signal. For purposes of illustration, it will be assumed initially that the said source of variable D.C. current has been adjusted so current will not begin to flow from those output terminals until shortly before the end of each half cycle of that square wave A.C. signal.

The switch 128 will be closed to initiate the supplying of power to the load 164; and when, after that switch has been closed, the A.C. voltage source, which is connected to the primary winding 121 of the transformer 120 and to the input terminals 26 and 28 of the output winding of the magnetic amplifier 20, next supplies a half cycle of that square wave A.C. signal to that primary winding, current will be caused to flow in the left-hand section of the secondary winding 118 of that transformer. If it is assumed that the said half cycle of the said square wave A.C. signal causes the current in the left-hand section of the secondary winding 118 to flow in such a direction as to charge the capacitor 126 so the upper terminal of that capacitor is positive, the controlled rectifier 108 will be back biased by that charge and will not become conductive. Hence, that half cycle of that square wave A.C. signal will not be able to affect the condition of either of the controlled rectifiers 108 and 104; and, consequently, those controlled rectifiers will remain non-conductive.

At the time the said A.C. voltage source applies the said half cycle of the said square wave A.C. signal to the primary winding 121, it will also supply that same half cycle to the input terminals 26 and 28 of the output winding of the magnetic amplifier 20; and that half cycle of that square wave A.C. signal will enable that output winding to supply a pulse or signal, which can best be measured by measuring the voltage across the resistor 52, and which will cause current to flow from the output terminals 40 and 42. The said half cycle of the said square wave A.C. signal from the said A.C. voltage source will precede the half cycle 250 of the square wave A.C. signal in FIG. 2; and the pulse or signal from the output winding of the magnetic amplifier 20 will precede the portion 254 of the wave-form of FIG. 3. Because the source of variable D.C. current, which is connected to the terminals 46 of the control winding 44, has been adjusted so current will not begin to flow until shortly before the end of each half cycle of the said square wave A.C. signal, the pulse or signal that is provided by the output winding of the magnetic amplifier 20 will be narrow and will be close to the end of the said half cycle of the said square wave A.C. signal. However, that pulse or signal will cause current to flow; and that current will have a value which will exceed the value of the current provided by the D.C. voltage source connected to the terminals 68 and 70, and that current will oppose the current provided by the said D.C. voltage source. As a result, direct current will flow from output terminal 40 through resistor 52, conductor 56, junctions 58 and 60, the base-emitter circuit of transistor 54, junction 84, conductor 78, junctions 82 and 86, diode 90, junctions 66 and 64, and conductor 62 to the output terminal 42. That current flow will render the transistor 57 non-conductive and will render the transistor 54 conductive; and the D.C. voltage source connected to the terminals 80 will then be able to cause the transistor 54 to conduct current. However, the resulting flow of current through the left-hand section of the primary winding 74 of transformer 76 will be unable to cause current to flow in the secondary winding of that transformer; because the controlled rectifier 104 will still be non-conductive.

If it were to be assumed that the said half cycle of the said square wave A.C. signal, which was supplied to the primary winding 121 and to the input terminals 26 and 28, had caused current to flow in the left-hand section of the secondary winding 118 in such a direction as to charge the capacitor 126 so the upper terminal of that capacitor was negative, and enough of that half cycle had been supplied to the primary winding 121 to largely charge the capacitor 126, the charge on that capacitor would be in the forward biasing direction for the controlled rectifier 108 and would be large enough to render that controlled rectifier conductive; but that controlled rectifier could not then become conductive because the anode of that controlled rectifier would be negative relative to the cathode of that controlled rectifier.

The overall result is that the first half cycle of the square wave A.C. signal, which is supplied to the primary winding 121 after the switch 128 is closed, will not be able to affect the condition of either of the controlled rectifiers 108 and 104; and hence those controlled rectifiers will remain non-conductive. This means that while the said first half cycle will render the transistor 57 non-conductive and will render the transistor 54 conductive, that first half cycle cannot cause signals to be applied to the gates of either of the controlled rectifiers 142 and 144. This is a desirable result; because if the controlled rectifier 108 could be turned "on" by that first half cycle of that square wave A.C. signal, that controlled rectifier might be turned "on" close to the end of that half cycle. If that controlled rectifier were to be so turned "on," it could cause the controlled rectifier 104 to turn "on" at the very end of that half cycle of the said square wave A.C. signal; and the controlled rectifier 104 could then permit a signal to be applied to the gate of the controlled rectifier 144 shortly before a signal was to be applied to the gate of the controlled rectifier 142. Where that occurred, the controlled rectifier 144 could have too little time to charge the capacitor 162, and that capacitor would then be unable to "blow out" that controlled rectifier when the controlled rectifier 142 became conductive. The controlled rectifier 144 would then remain conductive and would coact with the controlled rectifier 142 to "short circuit" the D.C. power sources 154 and 156. However, the "hold out" circuit of the control system of FIG. 1 avoids any such "short circuiting."

At the conclusion of the said first half cycle of the square wave A.C. signal supplied to the primary winding 121 and to the input terminals 26 and 28, current will stop flowing from the output terminals 40 and 42; and hence the voltage across the resistor 52 will drop to zero, as indicated by the portion 254 of the wave form of FIG. 3. Thereupon, the D.C. voltage source, which is connected to the terminals 68 and 70, will again cause current to flow through the base-emitter circuit of the transistor 57 and to flow through the diode 88, thereby again rendering the transistor 57 conductive and again rendering the transistor 54 non-conductive. Although the transistor 57 again becomes conductive, the right-hand section of the primary winding 74 will not be able to cause much current to flow through the secondary winding 92, because the controlled rectifier 104 will still be non-conductive.

At the beginning of the half cycle 250, of the square wave A.C. signal of FIG. 2 which is supplied to the primary winding 121 and to the input terminals 26 and 28, the charge on the capacitor 126 will still be in the forward biasing direction for the controlled rectifier 108, and the anode of that controlled rectifier will become positive relative to the cathode of that controlled rectifier. As a result, the controlled rectifier 108 will become conductive and will permit current to flow from the right-hand terminal of the right-hand section of the secondary winding 118 through parallel-connected resistor 113 and capacitor 111 and through the controlled rectifier 108 to the center tap of that secondary winding. That flow of current through the parallel-connected resistor 113 and capacitor 111 will charge that capacitor in the forward biasing direction for the controlled rectifier 104; and that controlled rectifier will then begin to conduct current. That controlled rectifier will be kept conductive during subsequent half cycles of the square wave A.C. signal of FIG. 2 because the time constant of the RC network, which includes the capacitor 111 and the resistor 113, will be long enough to keep the gate of that controlled rectifier positive.

Not only will the half cycle 250 of FIG. 2 render the controlled rectifier 104 conductive, but it will enable the output winding of the magnetic amplifier 20 to provide the positive-going pulse or signal 256 in FIG. 3, which is best measured by measuring the voltage across the resistor 52; and that pulse or signal will cause current to flow through the base-emitter circuit of the transistor 54 and through the diode 90, thereby rendering the transistor 54 conductive while rendering the transistor 57 non-conductive. As the transistor 54 becomes conductive, current will flow through the left-hand section of the primary winding 74; and that current flow will cause current to flow through the secondary winding 92, through the primary winding 94 of transformer 96 and through bridge rectifier 98, controlled rectifier 104 and resistor 106. The current flowing through the primary winding 94 will cause the secondary winding 140 to provide the signal 264 of FIG. 4 and to apply that signal to the gate of the controlled rectifier 144; and that signal will turn that controlled rectifier "on." As a result, current will flow from the positive terminal of the D.C. power source 156 past junctions 158 and 166, through the parallel-connected load 164 and capacitor 162, past junctions 168 and 150, through inductor 148 and controlled rectifier 144, and then past junction 160 to the negative terminal of that D.C. power source. The current flow through the parallel-connected load 164 and capacitor 162 will charge that capacitor so the left-hand terminal thereof becomes positive relative to the right-hand terminal thereof, and so the voltage across that capacitor will be substantially equal to the voltage of the D.C. power source 156. The voltage of the D.C. power source 154 will be substantially equal to the voltage of the D.C. power source 156; and hence the voltage across the capacitor 162 also will be substantially equal to the voltage of the D.C. power source 154. The voltage across the load 164 will be the same as that across the capacitor 162, and that voltage is indicated by the numeral 276 in FIG. 5. Although the voltage across the capacitor 162 will rise to a value that is substantially equal to the voltage of the power source 156, the length of time between the firing of the controlled rectifier 144 and the end of the half cycle 250 of FIG. 2 will be so short that even a small value of inductance for the load 164 will be able to hold the value of the current flowing through that load to a low value.

At the end of the half cycle 250 of FIG. 2, current will stop flowing from the output terminals 40 and 42 of the magnetic amplifier 20, as indicated by the portion 258 of the wave form of FIG. 3; and thereupon the current flow provided by the D.C. voltage source, connected to the terminals 68 and 70, will once again render the transistor 54 non-conductive while rendering the transistor 57 conductive. The resulting flow of current through the right-hand section of the primary winding 74 will cause current to flow through the secondary winding 92 and hence through the primary winding 94 of the transformer 96. That flow of current through the latter winding will enable the secondary winding 138 of the transformer 96 to provide the signal 266 of FIG. 4 and to apply that signal to the gate of the controlled rectifier 142; and that signal will turn that controlled rectifier "on."

As the controlled rectifier 142 is turned "on," that controlled rectifier will become essentially a "short circuit"; thereby raising the upper terminal of the inductor 146 to the positive voltage of the D.C. power source 154. The capacitor 162 will not instantaneously lose its charge or voltage, and hence a voltage which is substantially equal to twice the voltage supplied by the D.C. power source 154 will appear across the inductor 146; and the upper terminal of that inductor will be positive. The voltage across the inductor 146 will also, because of transformer action, appear across the inductor 148; and the voltage at the top of the inductor 148 also will be positive. The voltage across the inductor 148 will constitute an inverse voltage for the controlled rectifier 144 and will thereby promptly render that controlled rectifier non-conductive.

At this instant, the voltage appearing across the inductor 146 will be in opposition to, and will be substantially twice as large as, the voltage appearing across the capacitor 162; and, also at this instant, the core on which the inductors 146 and 148 are wound will transfer to the inductor 146 the energy which was stored within the inductor 148 while the controlled rectifier 144 was conducting current. As a result, the energy within the inductor 146 will be able to promptly start forcing the voltage, appearing across the capacitor 162, to move toward zero. The voltage appearing across the inductor 146 also will start moving toward zero; and the LC action of inductor 146 and capacitor 162 will drive the voltages, appearing across that inductor and that capacitor, through zero and into the opposite direction. As the voltage at the upper terminal of the inductor 146 passes through zero and increases in the negative direction, the voltage appearing across that inductor will apply a voltage across the primary winding 170 of the transformer 172. The latter voltage will not be able, initially, to cause an appreciable flow of current through that primary winding, because the bridge rectifier 182 which is connected to the terminals of the secondary winding 180 of that transformer will normally act as an "open circuit"—the combined voltages of the D.C. power sources 154 and 156 providing a sufficiently large back bias for the diodes of that bridge rectifier to normally render that bridge rectifier non-conducting. However, as the voltage at the upper terminal of the inductor 146 increases in the negative direction, the value of the voltage across the primary winding 170 will reach a value which, when multiplied by the secondary-to-primary turns ratio of the transformer 172, will exceed the combined voltages of the D.C. power sources 154 and 156.

Thereupon, the voltage induced in the secondary winding 180 will render the bridge rectifier 182 conductive; and current will then flow through the circuit which extends from the lower terminal of inductor 146, past junction 150, through primary winding 170, past junction 174, through diode 176, past junctions 188 and 152, and through controlled rectifier 142 to the upper terminal of the inductor 146. The total resistance of that circuit will be very small, and hence the flow of current through that circuit will be heavy; and that heavy current flow will "peg" the voltage at the upper terminal of the inductor 146, as by transferring a good part of the energy from the inductor 146 to the D.C. power sources 154 and 156. That transference is made possible because the transformer 172 and the bridge rectifier 182 will cause current to flow from the upper output terminal 186, past junctions 188 and 152, through D.C. power source 154, past junction 158, through D.C. power source 156, and past junctions 160 and 190 to the lower output terminal 186. In this way, a good part of the energy that was received from the D.C. power source 156 and was stored in the inductor 148, and was then transferred to the inductor 146 can be "pumped" back to that power source rather than being dissipated in the form of heat; and, also in this way, further increases in the value of the negative voltage at the upper terminal of the inductor 146 can be prevented. The transformer 172, the diode 176, and the bridge rectifier 182 will not only "peg" the voltage at the upper terminal of the inductor 146 but will also "peg" the voltage across the parallel-connected load 164 and capacitor 162, as indicated by the numeral 278 in FIG. 5.

At the time the controlled rectifier 142 was turned "on," current was flowing from left to right in the load 164; and, because of the inductance of that load, that current will tend to continue to flow from left to right in that load. As long as the voltage across the load 164 appreciably exceeds the voltage of the D.C. power source 154, current will continue to flow from left to right in that load; and that current will flow past junctions 168 and 150, through primary winding 170, past junction 174, through diode 176, past junctions 188 and 152, through D.C. power source 154, and past junctions 158 and 166 to that load. When the value of the voltage across the load 164 falls to the value of the D.C. power source 154, that power source will tend to cause current to flow from right to left in that load; and, because the controlled rectifier 142 will be permitted to remain conductive for a period of time which is longer than that during which the controlled rectifier 144 was permitted to remain conductive, the D.C. power source 154 will be able to halt further current flow from left to right in the load 164 and will be able to start current flowing from right to left in that load.

As the current flow through the inductor 146 levels off, the voltage across that inductor will drop to zero, and the voltage across the parallel-connected capacitor 162 and load 164 will decrease to the value of the voltage of the D.C. power source 154, as indicated by the numeral 280 in FIG. 5. This condition will continue until the next half cycle 252 of the square wave A.C. signal enables the output winding of the magnetic amplifier 20 to provide the pulse or signal 260 of FIG. 3. At such time, current from the output terminals 40 and 42 of the magnetic amplifier 20 will again overcome the reverse bias provided by the current from the D.C. voltage source, which is connected to the terminals 68 and 70, and will again render the transistor 57 non-conductive while rendering the transistor 54 conductive. The resulting flow of current through the left-hand section of the primary winding 74 of the transformer 76 will cause current to flow in the secondary winding 92 of that transformer and hence in the primary winding 94 of the transformer 96; and the secondary winding 140 will respond to that current flow to provide the signal 270 and to apply that signal to the gate of the controlled rectifier 144; and that signal will render that controlled rectifier conductive.

As the controlled rectifier 144 is turned "on," that controlled rectifier will become essentially a "short circuit"; thereby dropping the lower terminal of the inductor 148 to the negative voltage of the D.C. power source 156. The capacitor 162 will not instantaneously lose its charge or voltage, and hence a voltage which is substantially equal to twice the voltage supplied by the D.C. power source 156 will appear across the inductor 148; and the upper terminal of that inductor will be positive. The voltage across the inductor 148 will also, because of transformer action, appear across the inductor 146; and the voltage at the top of the inductor 146 also will be positive. The voltage across the inductor 146 will constitute an inverse voltage for the controlled rectifier 142 and will thereby promptly render that controlled rectifier non-conductive.

At this instant, the voltage appearing across the inductor 148 will be in opposition to, and will be substantially twice as large as, the voltage appearing across the capacitor 162; and, also at this instant, the core on which the inductors 146 and 148 are wound will transfer to the inductor 148 the energy which was stored within the inductor 146 while the controlled rectifier 142 was conducting current. As a result, the energy within the inductor 148 will be able to promptly start forcing the voltage, appearing across the capacitor 162, to move toward zero. The voltage appearing across the inductor 148 also will start moving toward zero; and the LC action of inductor 148 and capacitor 162 will drive the voltages appearing across that inductor and that capacitor through zero and into the opposite direction.

As the voltage at the upper terminal of the inductor 148 passes through zero and increases in the negative direction, the voltage appearing across that inductor will apply a voltage across the primary winding 170 of the transformer 172. The latter voltage will not be able, initially, to cause an appreciable flow of current through that primary winding, because the bridge rectifier 182 which is connected to the terminals of the secondary winding 180 will normally act as an "open circuit"—the combined voltages of the D.C. power sources 154 and 156 providing a sufficiently large back bias for the diodes of that bridge rectifier to normally render that bridge rectifier non-conductive. However, as the voltage at the upper terminal of the inductor 148 increases in the negative direction, the value of the voltage across the primary winding 170 will reach a value which, when multiplied by the secondary-to-primary turns ratio of the transformer 172, will exceed the combined voltages of the D.C. power sources 154 and 156. Thereupon, the voltage induced in the secondary winding 180 will render the bridge rectifier 182 conductive; and current will then flow through the circuit which extends from the lower terminal of inductor 148, through controlled rectifier 144, past junctions 160 and 190, through diode 178, past junction 174, through primary winding 170, and past junction 150 to the upper terminal of that inductor. The total resistance of that circuit will be very small, and hence the flow of current through that circuit will be heavy; and that heavy current flow will "peg" the voltage at the upper terminal of the inductor 148, as by transferring a good part of the energy from the inductor 148 to the D.C. power sources 154 and 156. That transference is made possible because the transformer 172 and the bridge rectifier 182 will cause current to flow from the upper output terminal 186, past junctions 188 and 152, through D.C. power source 154, past junction 158, through D.C. power source 156, and past junctions 160 and 190 to the lower output terminal 186. In this way, a good part of the energy that was received from the D.C. power source 154 and was stored in the inductor 146, and was then transferred to the inductor 148 can be "pumped" back to that power source rather than being dissipated in the form of heat; and, also in this way, further increases in the value of the negative voltage at the upper terminal of the inductor 148 can be prevented. The transformer 172, the diode 176, and the bridge rectifier 182 will not only "peg" the voltage at the upper terminal of the inductor 148 but will also "peg" the voltage across the parallel-connected load 164 and capacitor 162, as indicated by the numeral 282 in FIG. 5.

At the time the controlled rectifier 144 was turned "on," current was flowing from right to left in the load 164; and, because of the inductance of that load, that current will tend to continue to flow from right to left in that load. Current will continue to flow from right to left in that load; and that current will flow past the junctions 166 and 158, through the D.C. power source 156, past the junctions 160 and 190, through the diode 178, past the junction 174, through the primary winding 170, and past the junctions 150 and 168 to that load. When the value of the voltage across the load 164 falls to the value of the D.C. power source 156, that power source will tend to cause current to flow from left to right in that load; but the inductance of that load will be great enough and the duration of the conductive period of the controlled rectifier 142 will have been long enough, to enable the inductive action of the load to keep the current flowing uninterruptedly from right to left in the load 164. As a result, even though the D.C. power source 156 tends, during the time the controlled rectifier 144 is "on," to force the current to flow from left to right in the load 164, that current will continue to flow without interruption from right to left. This is desirable, because in many installations unidirectional current flow is necessary.

At the end of the half cycle 252 of FIG. 2, current will stop flowing from the output terminals 40 and 42 of the magnetic amplifier 20, as indicated by the portion 262 of the wave form of FIG. 3; and thereupon the flow of current provided by the D.C. voltage source, connected to the terminals 68 and 70, will once again render the transistor 54 non-conductive and will once again render the transistor 57 conductive. The resulting flow of current through the right-hand section of the primary winding 74 will cause current to flow through the secondary winding 92, and hence through the primary winding 94 of the transformer 96. The flow of current through the latter winding will enable the secondary winding 138 of the transformer 96 to provide the signal 272 of FIG. 4 and to apply that signal to the gate of the controlled rectifier 142; and that signal will turn that controlled rectifier "on."

As the controlled rectifier 142 is turned "on," the voltage across the capacitor 162 will coact with the voltage of the D.C. power source 154 to cause a voltage, which is substantially equal to twice the voltage of that power source, to appear across the inductor 146. That voltage will, because of transformer action, also appear across the inductor 148; with the voltage at the top of that inductor being positive. That voltage will constitute an inverse voltage for the controlled rectifier 144 and will thereby promptly render that controlled rectifier non-conductive.

The energy within the inductor 146 will promptly start forcing the voltage, appearing across the capacitor 162, to move toward zero. The voltage appearing across the inductor 146 also will start moving toward zero; and the LC action of inductor 146 and capacitor 162 will drive the voltages, appearing across that inductor and that capacitor, through zero and into the opposite direction. As the voltage at the upper terminal of the inductor 146 passes through zero and increases in the negative direction, the transformer 172 and the bridge rectifier 182 will coact with the diode 176 to "peg" the value of the voltage across the parallel-connected load 164 and capacitor 162 to the value indicated by the numeral 284 in FIG. 5. As long as the voltage across the load 164 appreciably exceeds the voltage of the D.C. power source 154, load current will flow past junctions 166 and 158, through the D.C. power source 154, past junction 152, through controlled rectifier 142, through inductor 146, and past junctions 150 and 168 to that load.

As the current flow through the inductor 146 levels off, the voltage across that inductor will drop to zero; and the voltage across the parallel-connected capacitor 162 and load 164 will decrease to the value of the voltage of the D.C. power source 154, as indicated by the numeral 286 in FIG. 5. This condition will continue until the next half cycle of the square wave A.C. signal enables the output winding of the magnetic amplifier 20 to provide a further pulse or signal of the type shown in FIG. 3. At such time, current from the output terminals 40 and 42 of the magnetic amplifier 20 will overcome the reverse bias on the transistor 54, which is provided by the current from the D.C. voltage source that is connected to the terminals 68 and 70; and the transistor 54 will again become conductive while the transistor 57 becomes non-conductive. The resulting flow of current through the transistor 54 and through the left-hand section of the primary winding 74 of the transformer 76 will cause current to flow in the secondary winding 92 of that transformer, and hence in the primary winding 94 of the transformer 96. The secondary winding 140 will respond to the current flow in the primary winding 94 to provide a further positive-going signal and will apply that signal to the gate of the controlled rectifier 144; and that signal will render that controlled rectifier conductive.

As the controlled rectifier 144 is turned "on," the control system of FIG. 1 will provide a further positive-going component like the positive-going component 282 of FIG. 5. Subsequently, the controlled rectifier 142 will be turned "on"; and thereupon the control system of FIG. 1 will provide a further negative-going component like the negative-going component 284—286 of FIG. 5. The various succeeding half cycles of the square wave A.C. signal, which is supplied to the input terminals 26 and 28, will successively cause the controlled rectifiers 144 and 142 to turn "on" and "off"; and as those controlled rectifiers turn "on" and "off," the control system of FIG. 1 will provide successive positive-going and negative-going components like the positive-going component 282 and like the negative-going component 284—286. The dwell times of those negative-going components will be materially longer than are the dwell times of those positive-going components; and hence the control system of FIG. 1 will supply the load 164 with a net, essentially D.C. negative voltage.

In the preceding illustration of the operation of the control system of FIG. 1, it was assumed that the source of variable D.C. current, which is connected to the terminals 46 of the controlled winding 44, had been adjusted so current would not begin to flow from the output terminals 40 and 42 of the magnetic amplifier 20 until shortly before the end of each half cycle of the square wave A.C. signal that was applied to the input terminals 26 and 28. However, if the source of variable D.C. current, which is connected to the terminals 46 of the control winding 44, is adjusted so current will begin to flow from the output terminals 40 and 42 of the magnetic amplifier 20 shortly after the beginning of each cycle of the square wave A.C. signal supplied to the input terminals 26 and 28, current will flow from left to right in the load 164 and a net, essentially D.C. positive voltage will be provided for that load. Specifically, the output winding of the magnetic amplifier 20 will respond to the half cycle 250 of FIG. 2 to provide the pulse or signal 290 of FIG. 6; and that pulse or signal will cause current to flow from the output terminal 40, through resistor 52, through conductor 56, past junctions 58 and 60, through the base-emitter circuit of the transistor 54, past junctions 84, 82 and 86, through diode 90, past junctions 66 and 64, and through conductor 62 to the terminal 42. That current flow will render the transistor 57 non-conductive and will render the transistor 54 conductive. As the transistor 54 becomes conductive, current will flow through the left-hand section of the primary winding 74; and that current flow will cause current to flow through the secondary winding 92 and hence through the primary winding 94 of transformer 96. The current flowing through the latter winding will cause the secondary winding 140 to provide the signal 296 of FIG. 7 and to apply that signal to the gate of the controlled rectifier 144; and that signal will turn that controlled rectifier "on." As a result, current will flow from the positive terminal of the D.C. power source 156 past junctions 158 and 166, through the parallel-connected load 164 and capacitor 162, past junctions 168 and 150, through inductor 148 and controlled rectifier 144, and then past junction 160 to the negative terminal of that D.C. power source. The current flow through the parallel-connected load and capacitor 162 will charge that capacitor so the left-hand terminal thereof becomes positive relative to the right-hand terminal thereof, and so the voltage across that capacitor will be substantially equal to the voltage of the D.C. power source 156. The voltage across the load 164 will be the same as that across the capacitor 162, and that voltage is indicated by the numeral 304 in FIG. 8. It will be noted that the current will be flowing from left to right through the load 164.

At the end of the half cycle 250 of FIG. 2, current will stop flowing from the output terminals 40 and 42 of the magnetic amplifier 20, as indicated by the portion 292 of the wave form of FIG. 6; and thereupon the D.C. voltage source, which is connected to the terminals 68 and 70, will once again render the transistor 54 non-conductive while rendering the transistor 57 conductive. The resulting flow of current through the right-hand section of the primary winding 74 will cause current to flow through the secondary winding 92 and hence through the primary winding 94 of the transformer 96. The flow of current through the latter winding will enable the secondary winding 138 of the transformer 96 to provide the signal 300 of FIG. 7 and to apply that signal to the gate of the controlled rectifier 142; and that signal will turn that controlled rectifier "on."

As the controlled rectifier 142 is turned "on," the capacitor 162 and the D.C. power source 154 will coact to cause a voltage, which is substantially equal to twice the voltage of that power source, to appear across the inductor 146, all as described hereinbefore. That large voltage will also appear across the inductor 148 and will render the controlled rectifier 144 non-conductive by applying an inverse voltage to it, all as described hereinbefore.

The voltage across the capacitor 162 will be driven toward zero by the energy within the inductor 146, and the voltage across that inductor also will move toward zero. The LC action of that capacitor and inductor will drive the voltages across that capacitor and inductor through zero and into the opposite direction; and the transformer 172, the bridge rectifier 182 and the diode 176 will "peg" the voltage at the upper terminal of the inductor 146, all as indicated by the numeral 306 in FIG. 8.

At the time the controlled rectifier 142 was turned "on," current was flowing from left to right in the load 164; and, because of the inductance of that load, that current will tend to continue to flow from left to right in that load. As long as the voltage across the load 164 appreciably exceeds the voltage of the D.C. power source 154, current will continue to flow from left to right in that load; and that current will flow past the junctions 168 and 150, through the primary winding 170, past the junction 174, through the diode 176, past the junctions 188 and 152, through the D.C. power source 154, and past the junctions 158 and 166 to that load. As the value of the voltage across the load 164 falls to the value of the D.C. power source 154, that power source will tend to cause current to flow from right to left in that load; but, because the controlled rectifier 142 will be permitted to remain conductive for only a short time, compared to the time during which the controlled rectifier 144 was permitted to remain conductive, the D.C. power source 154 will not be able to halt the flow of current from left to right through the load 164.

Shortly after the half cycle 252 is applied to the input terminals 26 and 28, the output winding of the magnetic amplifier 20 will initiate the signal or pulse 294 of FIG. 6; and the ensuing flow of current through the base-emitter circuit of transistor 54 will render that transistor conductive. The resulting flow of current through the left-hand section of the primary winding 74 will cause current to flow through the secondary winding 92 and hence through the primary winding 94. The secondary winding 140 will respond to the flow of current through the latter winding to provide the signal 302 of FIG. 7 and to apply that signal to the gate of controlled rectifier 144, thereby turning that controlled rectifier "on."

As the controlled rectifier 144 becomes conductive, the capacitor 162 and the D.C. power source 156 will coact to cause a voltage, which is substantially equal to twice the voltage of that power source, to appear across the inductor 148, all as described hereinbefore. That large voltage will also appear across the inductor 146 and will render the controlled rectifier 142 non-conductive by applying an inverse voltage to it, all as described hereinbefore.

The voltage across the capacitor 162 will be driven toward zero by the energy within the inductor 148, and the voltage across that inductor also will move toward zero. The LC action of that capacitor and inductor will drive the voltages across that capacitor and inductor through zero and into the opposite direction; and the transformer 172, the bridge rectifier 182 and the diode 176 will "peg" the voltage at the upper terminal of the inductor 148, as indicated by the numeral 308 in FIG. 8.

At the time the controlled rectifier 144 was turned "on," current was flowing from left to right in the load 164; and, because of the inductance of that load, that current will tend to continue to flow from left to right in that load. As long as the voltage across the load 164 appreciably exceeds the voltage of the D.C. power source 156, current will continue to flow from left to right in that load; and that current will flow past junctions 168 and 150, through inductor 148, controlled rectifier 144, junction 160, the D.C. power source 156, and junctions 158 and 166 to that load. Thereafter, the current flowing through the inductor 148 will level off; and at such time the voltage across that inductor will fall to zero, and the voltage across the load 164 will fall to the level indicated by the numeral 310 in FIG. 8.

The D.C. power source 156 will continue to urge the current to flow from left to right in the load 164. As a result, unidirectional flow of current through that load will be provided.

At the end of the half cycle 252 of FIG. 2, the controlled rectifier 142 will again be turned "on"; and at such time the control system of FIG. 1 will provide a further negative-going component like the negative-going component 306. Shortly after the beginning of the next half cycle, of the square wave A.C. signal applied to the input terminals 26 and 28, the controlled rectifier 144 will be turned "on"; and at such time the control system of FIG. 1 will provide a further positive-going component like the positive-going component 308—310. The various succeeding half cycles of the square wave A.C. signal, which is supplied to the input terminals 26 and 28, will successively cause the controlled rectifiers 142 and 144 to turn "on" and "off"; and as those controlled rectifiers turn "on" and "off," the control system of FIG. 1 will provide successive negative-going and positive-going components like the negative-going component 306 and like the positive-going component 308—310. The dwell times of those positive-going components will be materially longer than are the dwell times of those negative-going components; and hence the control system of FIG. 1 will supply the load 164 with a net, essentially D.C. positive voltage.

In the immediately preceding illustration of the operation of the control system of FIG. 1, it was assumed that the source of variable D.C. current, which is connected to the terminals 46 of the control winding 44, had been adjusted so current would begin to flow from the output terminals 40 and 42 of the magnetic amplifier 20 shortly after the beginning of each cycle of the square wave A.C. signal supplied to the input terminals 26 and 28. However, if the source of variable D.C. current, which is connected to the terminals 46 of the control winding 44, is adjusted so current will begin to flow from the output terminals 40 and 42 of the magnetic amplifier 20 at the middle of each half cycle of the square wave A.C. signal supplied to the input terminals 26 and 28, current will alternately tend to flow in opposite directions in the load 164 but a net zero current flow and a net zero voltage will result. Specifically, the output winding of the magnetic amplifier 20 will respond to the half cycle 250 of FIG. 2 to provide the pulse or signal 316 of FIG. 9 after the mid-point of the half cycle 250 has been reached; and that pulse or signal will cause current to flow from the output terminal 40, through resistor 52, through conductor 56, past junctions 58 and 60, through the base-emitter circuit of the transistor 54, past junctions 84, 82 and 86, through diode 90, past junctions 66 and 64, and through conductor 62 to the terminal 42. That current flow will render the transistor 57 non-conductive and will render the transistor 54 conductive. As the transistor 54 becomes conductive, current will flow through the left-hand section of the primary winding 74; and that current flow will cause current to flow through the secondary winding 92 and hence through the primary winding 94 of transformer 96. The current flowing through the latter winding will cause the secondary winding 140 to provide the signal 322 of FIG. 10 and to apply that signal to the gate of the controlled rectifier 144; and that signal will turn that controlled rectifier "on." As a result, current will flow from the positive terminal of the D.C. power source 156 past junctions 158 and 166, through the capacitor 162, past junctions 168 and 150, through inductor 148 and controlled rectifier 144, and then past junction 160 to the negative terminal of that D.C. power source. The current flow through the capacitor 162 will charge that capacitor so the left-hand terminal thereof becomes positive relative to the right-hand terminal thereof, and so the voltage across that capacitor will be substantially equal to the voltage of the D.C. power source 156. The voltage across the load 164 will be the same as that across the capacitor 162, and that voltage is indicated by the numeral 332 in FIG. 11. It will be noted that the current will tend to flow from left to right in the load 164.

At the end of the half cycle 250 of FIG. 2, current will stop flowing from the output terminals 40 and 42 of the magnetic amplifier 20, as indicated by the portion 318 of the wave form of FIG. 9; and thereupon the D.C. voltage source, which is connected to the terminals 68 and 70, will once again render the transistor 54 non-conductive while rendering the transistor 57 conductive. The resulting flow of current through the right-hand section of the primary winding 74 will cause current to flow through the secondary winding 92 and hence through the primary winding 94 of the transformer 96. The flow of current through the latter winding will enable the secondary winding 138 of the transformer 96 to provide the signal 326 of FIG. 10 and to apply that signal to the gate of the controlled rectifier 142; and that signal will turn that controlled rectifier "on."

As the controlled rectifier 142 is turned "on," the capacitor 162 and the D.C. power source 154 will coact to cause a voltage, which is substantially equal to twice the voltage of that power source, to appear across the inductor 146, all as described hereinbefore. That large voltage will also appear across the inductor 148 and will render the controlled rectifier 144 non-conductive by applying an inverse voltage to it, all as described hereinbefore.

The voltage across the capacitor 162 will be driven toward zero by the energy within the inductor 146, and the voltage across that inductor also will move toward zero. The LC action of that capacitor and inductor will drive the voltages across that capacitor and inductor through zero and into the opposite direction; and the transformer 172, the bridge rectifier 182 and the diode 176 will "peg" the voltage at the upper terminal of the inductor 146, all as indicated by the numeral 334 in FIG. 11.

At the time the controlled rectifier 142 was turned "on," current was tending to flow from left to right in the load 164; and, because of the inductance of that load, that current will continue to tend to flow from left to right in that load.

However, the D.C. power source 154 will tend to cause current to flow from right to left in that load; and because the controlled rectifier 142 will be permitted to remain conductive for the same length of time during which the controlled rectifier 144 was permitted to remain conductive, the D.C. power source 154 will be able to prevent the flow of current from left to right through the load 164. The overall result is that a net current flow of zero will be provided for the load 164. Thereafter, the current flowing through the inductor 146 will level off; and at such time the voltage across that inductor will fall to zero, and the voltage across the load 164 will fall to the level indicated by the numeral 336 in FIG. 11.

At the midpoint of the half cycle 252 of FIG. 2, the output winding of the magnetic amplifier 20 will initiate the signal or pulse 320 of FIG. 9, and the ensuing flow of current through the base-emitter circuit of transistor 54 will render that transistor conductive. The resulting flow of current through the left-hand section of the primary winding 74 will cause current to flow through the secondary winding 92 and hence through the primary winding 94. The secondary winding 140 will respond to the flow of current through the latter winding to provide the signal 330 of FIG. 10 and to apply that signal to the gate of controlled rectifier 144, thereby turning that controlled rectifier "on."

As the controlled rectifier 144 becomes conductive, the capacitor 162 and the D.C. power source 156 will coact to cause a voltage, which is substantially equal to twice the voltage of that power source, to appear across the inductor 148, all as described hereinbefore. That large voltage will also appear across the inductor 146 and will render the controlled rectifier 142 non-conductive by applying an inverse voltage to it, all as described hereinbefore.

The voltage across the capacitor 162 will be driven toward zero by the energy within the inductor 148, and the voltage across that inductor also will move toward zero. The LC action of that capacitor and inductor will drive the voltages across that capacitor and inductor through zero and into the opposite direction; and the transformer 172, the bridge rectifier 182 and the diode 176 will "peg" the voltage at the upper terminal of the inductor 148, all as indicated by the numeral 338 in FIG. 11.

At the time the controlled rectifier 144 was turned "on," current was tending to flow from right to left in the load 164; and, because of the inductance of that load, that current will continue to tend to flow from right to left in that load.

However, the D.C. power source 156 will tend to cause current to flow from left to right in that load; and because the controlled rectifier 144 will be permitted to remain conductive for the same length of time during which the controlled rectifier 142 was permitted to remain conductive, the D.C. power source 156 will be able to prevent the flow of current from right to left through the load 164. The overall result is that a net current flow of zero will be provided in the load 164. Thereafter, the current flowing through the inductor 148 will level off; and at such time the voltage across that inductor will fall to zero, and the voltage across the load 164 will fall to the level indicated by the numeral 340 in FIG. 11.

At the end of the half cycle 252 of FIG. 2, the controlled rectifier 142 will again be turned "on"; and at such time the control system of FIG. 1 will provide a further negative-going component like the negative-going component 334—336 and it will tend to cause a flow of current from right to left in the load 164. At the midpoint of the next half cycle, of the square wave A.C. signal applied to the input terminals 26 and 28, the controlled rectifier 144 will be turned "on"; and at such time the control system of FIG. 1 will provide a further positive-going component like the positive-going component 338—340 and it will tend to cause a flow of current from left to right in the load 164. The various succeeding half cycles of the square wave A.C. signal, which is supplied to the input terminals 26 and 28, will successively cause the controlled rectifiers 142 and 144 to turn "on" and "off"; and as those controlled rectifiers turn "on" and "off," the control system of FIG. 1 will provide successive negative-going and positive-going components like the negative-going component 334—336 and like the positive-going component 338—340 and will alternately tend to cause current to flow in opposite directions in the load 164. The dwell times of those positive-going components will equal the dwell times of those negative-going components; and hence the control system of FIG. 1 will supply the load with an essentially zero current flow and voltage.

The control system provided by the present invention operates on the principle of controlling the average, or D.C., value of the voltage supplied to a load by continuously reversing the polarity of a fixed D.C. voltage and by varying the relative dwell times of the positive-going and negative-going components of the voltage supplied to the load. As a result, the net voltage supplied to the load will be equal to the value of said fixed D.C. voltage multiplied by the ratio of the difference between the said dwell times to the sum of those dwell times.

By appropriately varying the D.C. voltage which is supplied to the terminals 46 of the control winding 44 of the magnetic amplifier 20, it is possible to provide an infinite number of net essentially D.C. positive voltages and to provide an infinite number of net essentially D.C. negative voltages and to provide zero voltage. Further, it will be noted that the control system provided by the present invention is able to do this even though it is supplied with fixed D.C. voltages by the D.C. power sources 154 and 156. It should also be noted that when the value of the D.C. voltage that is applied to the terminals 46 of control winding 44 is plotted against the values of the net voltages across the load 164, a straight-line characteristic is obtained. Such a characteristic shows that the control system provided by the present invention can be used as an unusually high fidelity D.C. push-pull amplifier.

Where the load 164 of FIG. 1 has considerable inductance, and where the variable D.C. voltage source connected to the terminals 46 of the control winding 44 is set to provide different dwell times for the positive-going and negative-going components of the voltage supplied to that load, current will flow unidirectionally through the load 164. Where that load has no appreciable inductance, and where the variable D.C. current source connected to the terminals 46 of the control winding 44 is set to provide different dwell times for the positive-going and negative-going components of the voltage supplied to that load, current will flow in opposite directions through that load. The ratio of the inductance to the resistance of a given load will determine whether current will flow in just one direction or in both directions in that load. Preferably, the load 164 will have enough inductance to keep that load from unduly damping the LC action of capacitor 162 and inductor 146 or the LC action of capacitor 162 and inductor 148.

FIG. 12 discloses a control system which utilizes a magnetic amplifier 20 and which uses transistors 54 and 57 to supply signals to the secondary winding 92 of the transformer 76. However, the terminals of that secondary winding are connected directly to the terminals of the primary winding 94 rather than being connected to the terminals of that primary winding through the bridge rectifier 98 and the controlled rectifier 104, as in the case of the control system of FIG. 1.

In FIG. 12, the numerals 198, 200, 202 and 204 denote controlled rectifiers; and the anodes of the controlled rectifiers 198 and 202 are connected together by a junction 218. The cathode of the controlled rectifier 198 is connected to the anode of the controlled rectifier 200 by junctions 208 and 212; and the cathode of the controlled rectifier 202 is connected to the anode of the controlled rectifier 204 by junctions 210 and 214. The cathodes of the controlled rectifiers 200 and 204 are connected together by a junction 224. As inductor 220, a D.C. power source 222, and an inductor 226 connect the junction 218 to the junction 224. A load 206 is connected to the junctions 208 and 210, and a capacitor 216 is connected to the junctions 212 and 214. The terminal 228 of the secondary winding 138 of the transformer 96 will be connected to the gates of the controlled rectifiers 200 and 202, and the terminal 230 of that winding will be connected to the cathodes of those controlled rectifiers. The terminal 234 of the secondary winding 140 of that transformer will be connected to the gates of the controlled rectifiers 198 and 204, and the terminal 232 of that winding will be connected to the cathodes of those controlled rectifiers. The inductors 220 and 226 are shown as being spaced apart, but those inductors will either be wound on the same core or will be parts of a center-tapped inductor.

When the half cycle 250 of FIG. 2 is supplied to the input terminals 26 and 28, the output winding of the magnetic amplifier 20 of FIG. 12 will provide a pulse or signal that will render the transistor 54 conductive; and the resulting flow of current through the left-hand section of the primary winding 74 will enable the secondary winding 140 to render the controlled rectifiers 198 and 204 conductive. Current will then flow from the D.C. power source 222 through inductor 220, past junction 218, through controlled rectifier 198, past junction 208, through parallel-connected capacitor 216 and load 206, past junction 214, through controlled rectifier 204, past junction 224, and through inductor 226 to that D.C. power source. The capacitor 216 will charge so the left-hand terminal thereof will be positive and so the voltage thereacross will be equal to the voltage of the D.C. power source 222. The current will be flowing from left to right through the load 206.

At the end of the half cycle 250, the secondary winding 138 will render the controlled rectifiers 200 and 202 conductive; and those controlled rectifiers will enable the capacitor 216 to apply an inverse voltage to the controlled rectifiers 198 and 204. That inverse voltage will promptly render the controlled rectifiers 198 and 204 non-conductive. The capacitor 216 will lose part of its charge in rendering the controlled rectifiers 200 and 202 non-conductive; and the remainder of its charge will be transferred to the load 206 and to the inductors 220 and 226.

As the capacitor 216 loses its charge, the current flowing from D.C. power source 222, through inductor 220, past junction 218, through controlled rectifier 202, past junctions 210 and 214, through capacitor 216, past junction 212, through controlled rectifier 200, past junction 224, and through the inductor 226 to that D.C. power source will charge that capacitor in the opposite direction. Specifically, the right-hand terminal of that capacitor will be rendered positive, and the current will flow from right to left in that capacitor; and the voltage across that capacitor will rise to the voltage of the D.C. power source 222.

Succeeding half cycles of the square wave A.C. signal applied to the input terminals 26 and 28 will alternately "fire" controlled rectifiers 198 and 204 and controlled rectifiers 200 and 202. Each time a pair of those controlled rectifiers is rendered conductive, the capacitor 216 will be able to coact with those controlled rectifiers to render the previously-conductive pair of controlled rectifiers non-conductive, as by applying inverse voltages to those controlled rectifiers. Further, each time a pair of those controlled rectifiers is rendered conductive, capacitor 216 will lose its charge and will become charged in the opposite direction. Further, each time a pair of those controlled rectifiers is rendered conductive, the direction of current flow through the capacitor 216 will reverse.

Although the direction of current flow through the capacitor 216 will reverse periodically, the load 206 will usually have sufficient inductance to keep the current flowing in the same direction through that load, except where the net essentially D.C. voltage is close to zero. The relative lengths of the dwell times of the positive-going and negative-going components of the voltage applied to the load 206 will determine the particular direction in which the current will flow through that load.

The control system of FIG. 12 does not have "pump back" circuit of the control system of FIG. 1; and hence that circuit can not have the high efficiency of the control system of FIG. 1. The latter system has a very high efficiency for a push-pull D.C. amplifier that is operable at high power levels—that control system providing efficiencies as high as seventy percent while supplying several kilowatts of power to the load 164. Further, that control system is able to utilize a fixed D.C. voltage to provide D.C. which has components of opposite polarities and of variable value which has a straight line characteristic as it passes through zero.

The control system of FIG. 12 also does not have the protection of the "hold out" circuit of FIG. 1; and hence the control system of FIG. 12 may occasionally blow a fuse if the capacitor 216 is charged insufficiently, as it could be if the power were turned "on" close to the end of a half cycle of the square wave A.C. signal which is supplied to the input terminals 26 and 28 of the output winding of the magnetic amplifier 20. In such an event, the next half cycle of the square wave A.C. signal would turn "on" the other pair of controlled rectifiers and the charge on the capacitor 216 would not be large enough to "blow out" the pair of previously conductive controlled rectifiers. All four of the controlled rectifiers would then be "on," and they would constitute a direct "short circuit" for the D.C. power source 222, with consequent "blowing" of the fuses protecting that power source. While the blowing of fuses is not desirable, such blowing is not unacceptable where the control system is left "on" for long periods of time after it has been turned "on." Where cost is a factor, the control system of FIG. 12 can be used; but where optimum protection and optimum efficiency are desired, the control system of FIG. 1 should be used.

The control system of FIGS. 1 and 12 continuously reverse the polarities of the D.C. voltages which they apply to their loads. Further, those control systems can respond to the mere adjusting of the value of the direct current applied to the terminals 46 to provide variable dwell times for the positive-going and negative-going components of the output wave-forms which those control systems supply to their loads, and can thereby determine the polarity and net value of the voltage applied to the load and can also determine the direction in which current will flow through that load. This means that those control systems can supply output waveforms that can closely simulate positive D.C. and that can closely simulate negative D.C. and that can be closely controlled. As a result, those control systems can provide unique and highly precise control of the loads to which they are connected.

Where desired, a plurality of the control systems provided by the present invention can be interrelated and can be supplied with rectified alternating current. Thus, FIG. 13 shows that three of the control systems of FIG. 1 can be interrelated and can be supplied with rectified alternating current. The numerals 400, 402, 404, 406, 408 and 410 denote the diodes of a bridge rectifier 396 which is connected to a three phase A.C. power source by the conductors 412, 414 and 416. The numerals 418, 420, 422, 424, 426 and 428 denote the diodes of a bridge rectifier 398 which is connected to a second three phase A.C. power source by the conductors 430, 432 and 434. Those bridge rectifiers will coact with the said three phase A.C. power sources to make the terminal 436 positive relative to the terminal 438 and to make the terminal 438 positive relative to the terminal 440. A capacitor 442 is connected between the terminals 436 and 438 and a capacitor 444 is connected between the terminals 438 and 440.

The terminal 436 is connected to the junction 152 of each of the three control systems, the terminal 438 is connected to the junction 166 of each of the three control systems, and the terminal 440 is connected to the junction 160 of each of the three control systems. Insofar as any one of the three control systems is concerned, the bridge rectifier 396 and its capacitor 442 and its three phase A.C. power source will appear to be identical to the D.C. power source 154 of FIG. 1. Similarly, insofar as any one of the three control systems is concerned, the bridge rectifier 398 and its capacitor 444 and its three phase A.C. power source will appear to be identical to the D.C. power source 156 of FIG. 1. This means that each of the three control systems of FIG. 13 can respond to the signals which are supplied to it via the conductors 135, 137, 139 and 141 to supply a net essentially D.C. positive voltage, zero voltage, or a net essentially D.C. negative voltage to its load 164. Each control system will preferably have its own magnetic amplifier 20 and its own transistors 54 and 57; and where this is the case, it will be possible to establish different values and polarities for the various loads 164 of the three control systems.

Whenever the inductor 146 or 148 of one of the three control systems is "pumping back" energy via the transformer 172, the bridge rectifier 182 and the diode 176 of that control system, one or the other of the three control systems will usually be drawing energy. The magnitude of the current flowing back toward the power sources will be substantially equal to the magnitude of the current being drawn from those power sources. This means that during substantially all of the time when energy is being "pumped back" by one or the other of the three control systems, that energy will be drawn by another of the three control systems. Such an arrangement is desirable because it permits the use of smaller capacitors 442 and 444 and it minimizes losses due to the impedances of those capacitors. During those limited periods when one of the three control system is "pumping back" energy and neither of the other two control systems is drawing energy, the "pumped back" energy will be stored in the capacitors 442 and 444. That "pumped back" and stored energy will subsequently be drawn by another of the control systems.

It is possible to select values and wave-forms, for the current supplied to the terminals 46 of the control windings 44 of the magnetic amplifiers 20 of the interrelated control systems, which will enable at least one of those control systems to be drawing energy whenever another of those control systems is "pumping back" energy. Where this is done, the values of the capacitors 442 and 444 can be made quite small.

When the dwell times of the positive-going and negative-going components of the voltages applied to a load are unequal, that load must, during each of the short dwell times, free itself of any inductive energy; and this is accomplished by causing load current to flow through the paths and in the manner described hereinbefore. Where a number of control systems are interrelated in the manner shown by FIG. 13, the freeing of any given load of its inductive energy is accomplished with particular ease; because the control systems that are instantaneously drawing energy will readily absorb the energy from that given load. In this way, that given load will not have to force its inductive energy back into the power source.

In selecting a frequency for the square wave A.C. signal that is to be applied to the input terminals 26 and 28, care must be taken to keep that frequency low enough to enable the previously-conductive controlled rectifiers to be "blown out." However, frequencies up to four thousand cycles per second can be used. Also, the value of the direct current applied to the terminals 50 of the bias winding 48 must be selected to enable the half cycles of the square wave A.C. signal to provide pulses or signals from the output winding that are long enough to adequately charge the capacitors 162 and 216.

Controlled rectifiers are shown in the control systems of FIGS. 1 and 12, and controlled rectifiers are the preferred control elements of those control systems. However, other control elements, such as thyratrons and switching transistors could be used.

Whereas the drawing and accompanying description have shown and described two preferred embodiments of the present invention, it should be apparent to those skilled in the art that various changes may be made in the form of the invention without affecting the scope thereof.

What I claim is:

1. A control system that can provide different values of essentially D.C. positive voltage, can provide zero voltage and can provide different values of essentially D.C. negative voltage for a load and that comprises a plurality of controlled rectifiers which can selectively be rendered conductive and non-conductive, at least one of said controlled rectifiers being connected to said load and being adapted to apply a positive-going voltage to said load, at least another of said controlled rectifiers being connected to said load and being adapted to apply a negative-going voltage to said load, a capacitor which is connected to said controlled rectifiers and which is connected in parallel with said load, said capacitor storing energy therein and being polarized in one direction whenever said one controlled rectifier is conducting current and is applying said positive-going voltage to said load, and storing energy therein and being polarized in the opposite direction whenever said other controlled rectifier is conducting current and is applying said negative-going voltage to said load, an inductor which is connected in series with said controlled rectifiers and that stores energy whenever said one controlled rectifier is conducting current and is applying said positive-going voltage to said load and that stores energy whenever said other controlled rectifier is conducting current and is applying said negative-going voltage to said load, a transformer that has the primary winding thereof connected to said inductor, a bridge rectifier that connects the secondary winding of said transformer to the power source for said control system, a signal source that is adapted to provide signals that can selectively render said one controlled rectifier conductive and that can selectively render said other controlled rectifier conductive, and a "hold out" circuit that keeps the first signal from said signal source from rendering said one or said other controlled rectifier conductive, said one controlled rectifier responding to a signal from said signal source to become conductive and to apply said positive-going voltage to said load and to store energy in said capacitor and in said inductor, said other controlled rectifier subsequently responding to a further signal from said signal source to become conductive and to apply said negative-going voltage to said load and also to enable said capacitor and said inductor to render said one controlled rectifier non-conductive, said inductor thereafter causing current to flow through said primary winding of said transformer to enable said transformer and said bridge rectifier to pump energy from said inductor back to said power source, said second controlled rectifier thereafter enabling energy to be stored in said capacitor and in said inductor, said one controlled rectifier, in turn, responding to a still further signal from said signal source to become conductive and to apply said positive-going voltage to said load and also to enable said capacitor and said inductor to render said other controlled rectifier non-conductive, said inductor thereafter causing current to flow through said primary winding of said transformer to enable said transformer and said bridge rectifier to pump energy from said inductor back to said power source, said "hold out" circuit preventing the supply of signals to said one or said other controlled rectifiers that could render them conductive but would not charge said capacitor sufficiently to enable said capacitor to subsequently render said one or said other controlled rectifier non-conductive, said signal source being capable of making the dwell times of said one and said other controlled rectifier relatively different.

2. A control system that can provide different values of essentially D.C. positive voltage, can provide zero voltage and can provide different values of essentially D.C. negative voltage for a load and that comprises a plurality of controlled rectifiers which can selectively be rendered conductive and non-conductive, at least one of said controlled rectifiers being connected to said load and being adapted to apply a positive-going voltage to said load, at least another of said controlled rectifiers being connected to said load and being adapted to apply a negative-going voltage to said load, a capacitor which is connected to said controlled rectifiers, said capacitor storing energy therein and being polarized in one direction whenever said one controlled rectifier is conducting current and is applying said positive-going voltage to said load and storing energy therein and being polarized in the opposite direction whenever said other controlled rectifier is conducting current and is applying said negative-going voltage to said load, an inductor which is connected in series with said controlled rectifiers and that stores energy whenever said one controlled rectifier is conducting current and is applying said positive-going voltage to said load and that stores energy whenever said other controlled rectifier is conducting current and is applying said negative-going voltage to said load, a transformer that has the primary winding thereof connected to said inductor, a rectifier that connects the secondary winding of said transformer to the power source for said control system, and a signal source that is adapted to provide signals that can selectively render said one controlled rectifier conductive and that can selectively render said other controlled rectifier conductive, said one controlled rectifier responding to a signal from said signal source to become conductive and to apply said positive-going voltage to said load and to store energy in said capacitor and in said inductor, said other controlled rectifier subsequently responding to a further signal from said signal source to become conductive and to apply said negative-going voltage to said load and also to enable said capacitor and said inductor to render said one controlled rectifier non-conductive, said inductor thereafter causing current to flow through said primary winding of said transformer to enable said transformer and said bridge rectifier to pump energy from said inductor back to said power source, said second controlled rectifier thereafter enabling energy to be stored in said capacitor and in said inductor, said one controlled rectifier, in turn, responding to a still further signal from said signal source to become conductive and to apply said positive-going voltage to said load and also to enable said capacitor and said inductor to render said other controlled rectifier non-conductive, said inductor thereafter causing current to flow through said primary winding of said transformer to enable said transformer and said bridge rectifier to pump energy from said inductor back to said power source, said signal source being capable of making the dwell times of said one and said other controlled rectifier relatively different.

3. A control system that can provide different values of essentially D.C. positive voltage, can provide zero voltage and can provide different values of essentially D.C. negative voltage for a load and that comprises a plurality of controlled rectifiers which can selectively be rendered conductive and non-conductive, at least one of said controlled rectifiers being connected to said load and being adapted to apply a positive-going voltage to said load, at least another of said controlled rectifiers being connected to said load and being adapted to apply a negative-going voltage to said load, a capacitor which is connected to said controlled rectifiers, said capacitor storing energy therein and being polarized in one direction whenever said one controlled rectifier is conducting current and is applying said positive-going voltage to said load and storing energy therein and being polarized in the opposite direction whenever said other controlled rectifier is conducting current and is applying said negative-going voltage to said load, an inductor which is connected in series with said controlled rectifiers and that stores energy whenever said one controlled rectifier is conducting current and is applying said positive-going voltage to said load and that stores energy whenever said other controlled rectifier is conducting current and is applying said negative-going voltage to said load, and a signal source that is adapted to provide signals that can selectively render said one controlled rectifier conductive and that can selectively render said other controlled rectifier conductive, said one controlled rectifier responding to a signal from said signal source to become conductive and to apply said positive-going voltage to said load and to store energy in said capacitor and in said inductor, said other controlled rectifier subsequently responding to a further signal from said signal source to become conductive and to apply said negative-going voltage to said load and also to enable said capacitor and said inductor to render said one controlled rectifier non-conductive, said second controlled rectifier thereafter enabling energy to be stored in said capacitor and in said inductor, said one controlled rectifier, in turn, responding to a still further signal from said signal source to become conductive and to apply said positive-going voltage to said load and also to enable said capacitor and said inductor to render said other controlled rectifier non-conductive, said signal source being capable of making the dwell times of said one and said other controlled rectifier relatively different.

4. A control system that can provide different values of essentially D.C. positive voltage, can provide zero voltage and can provide different values of essentially D.C. negative voltage for a load and that comprises a plurality of controlled rectifiers which can selectively be rendered conductive and non-conductive, at least one of said controlled rectifiers being connected to said load and being adapted to apply a positive-going voltage to said load, at least another of said controlled rectifiers being connected to said load and being adapted to apply a negative-going voltage to said load, a capacitor which is connected to said controlled rectifiers, said capacitor storing energy therein and being polarized in one direction whenever said one controlled rectifier is conducting current and is applying said positive-going voltage to said load and storing energy therein and being polarized in the opposite direction whenever said other controlled rectifier is conducting current and is applying said negative-going voltage to said load, and a signal source that is adapted to provide signals that can selectively render said one controlled rectifier conductive and that can selectively render said other controlled rectifier conductive, said one controlled rectifier responding to a signal from said signal source to become conductive and to apply said positive-going voltage to said load and to store energy in said capacitor, said other controlled rectifier subsequently responding to a further signal from said signal source to become conductive and to apply said negative-going voltage to said load and also to enable said capacitor to render said one controlled rectifier non-conductive, said signal source being capable of making the dwell times of said one and said other controlled rectifier relatively different.

5. A control system that includes a controlled rectifier which can supply D.C. to a load, a commutating inductor, a capacitor, and a transformer that has the primary winding thereof connected to said commutating inductor so said commutating inductor can supply energy to said primary winding, and a rectifier that connects the secondary winding of said transformer to the power source for said control system so said secondary winding can transfer energy to said power source, said controlled rectifier being adapted to be rendered conductive and to store energy in said commutating inductor and in said capacitor, said energy being adapted to render said controlled rectifier non-conductive by applying an inverse voltage to it and to act through said transformer and said rectifier to pump energy back into said power source.

6. A control system that can provide different values of essentially D.C. positive voltage, can provide zero voltage and can provide different values of essentially D.C. negative voltage for a load and that comprises a plurality of controlled rectifiers which can selectively be rendered conductive and non-conductive, one of said controlled rectifiers applying a positive-going voltage to said load and another of said controlled rectifiers applying a negative-going voltage to said load, and a member that stores energy whenever either of said controlled rectifiers is conductive, a transformer that can receive energy from said member and that can transfer said energy to the power source for said control system, said controlled rectifiers being alternately conductive to apply said positive-going voltage to said load and to apply said negative-going voltage to said load and also to recurrently enable said transformer to transfer energy from said member to said power source.

7. A control system that includes a controlled rectifier, a second controlled rectifier, an inductor, a capacitor, and a transformer that has the primary winding thereof connected to said inductor, and a rectifier that connects the secondary winding of said transformer to the power source for said control system, the first said controlled rectifier being adapted to be rendered conductive and to store energy in said inductor and in said capacitor, said second controlled rectifier being adapted to be rendered conductive and to store energy in said inductor and in said capacitor, said second controlled rectifier enabling said energy, whenever said second controlled rectifier becomes conductive, to render the first said controlled rectifier non-conductive by applying an inverse voltage to it and to act through said transformer and said rectifier to pump energy back into said power source, said one controlled rectifier enabling said energy, whenever said one controlled rectifier becomes conductive, to render said second controlled rectifier non-conductive by applying an inverse voltage to it and to act through said transformer and said rectifier to pump energy back into said power source.

8. A control system that can provide different values of essentially D.C. positive voltage, can provide zero voltage and can provide different values of essentially D.C. negative voltage for a load and that comprises a plurality of control members which can selectively become conductive and non-conductive, at least one of said control elements being connectable to said load to apply a positive-going voltage to said load, another of said control elements being connectable to said load to apply a negative-going voltage to said load, an impedance which is connected to said one and said other control elements and which can store energy during the periods when said one and said other of said control elements are conductive, a signal source that is adapted to provide signals that can selectively render said one control member and said other of said control members conductive and that can make the dwell times of said one and said other of said control members of different durations, said one control member responding to a signal from said signal source to become conductive and to cause current to flow through said impedance and thereby store energy in said impedance, said other control member being adapted to respond to a signal from said signal source to become conductive and thereby enable energy to discharge from said impedance to effect prompt rendering of said one control member non-conductive and to subsequently cause current to flow through said impedance in the opposite direction and thereby store energy in said impedance, said one control member responding to a further signal from said signal source to become conductive and thereby enable energy to discharge from said impedance to effect prompt rendering of said other control member non-conductive and to subsequently cause current to flow through said impedance in the first said direction.

9. In a control system which can provide different values of essentially D.C. positive voltage, can provide zero voltage and can provide different values of essentially D.C. negative voltage for a load and that comprises a plurality of control members which are selectively rendered conductive and non-conductive, an impedance which can respond to the passage of curernt through said control members to store energy, one of said control members applying a positive-going voltage to said load as it becomes conductive, another of said control members applying a negative-going voltage to said load as it becomes conductive, said impedance rendering said one control member non-conductive as said other control member becomes conductive and rendering said other control member non-conductive as said one control member becomes conductive, and a signal source that alternately renders said one and said other control members conductive, said signal source being adapted to vary the lengths of the periods between the initiations of the conductive periods of said one and said other control members and thereby vary the dwell times of said positive-going and negative-going voltages applied to said load.

10. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, a third member that can render the first said control member non-conductive when said second control member becomes conductive and that can render said second control member non-conductive when the first said control member becomes conductive, and a signal source that can selectively render the first said control member and said second control member conductive, said signal source being capable of varying the periods of time between the initiation of the conductive periods of the first said control member and of said second control member to vary the relative dwell times for said positive-going and negative-going components for said load.

11. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, said control system rendering the first said control member non-conductive when said second control member becomes conductive and rendering said second control member non-conductive when the first said control member becomes conductive, and an initiating member that can initiate conductive periods of the first said control member and that can initiate conductive periods of said second control member, said initiating member being capable of varying the periods of time between the initiation of the conductive periods of the first said control member and of said second control member.

12. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, a third member that can render the first said control member non-conductive when said second control member becomes conductive and that can render said second control member non-conductive when the first said control member becomes conductive, and a signal source that can alternately render the first said control member and said second control member conductive, said signal source being capable of varying the periods of time between the initiation of the conductive periods of the first said control member and of said second control member to vary the relative dwell times for said positive-going and negative-going components for said load, said control members being controlled rectifiers, said third member being a capacitor.

13. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, said control system rendering the first said control member non-conductive when said second control member becomes conductive and rendering said second control member non-conductive when the first said control member becomes conductive, and an initiating member that can initiate conductive periods of the first said control member and that can initiate conductive periods of said second control member, said initiating member being capable of varying the periods of time between the initiation of the conductive periods of the first said control member and of said second control member, said control members being controlled rectifiers, said initiating member being a signal source which includes a magnetic amplifier.

14. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, a capacitor that can render the first said control member non-conductive when said second control member becomes conductive and that can render said second control member non-conductive when the first said control member becomes conductive, an inductance to limit current flow as the first said control member or said second control member becomes conductive, and a signal source that can selectively render the first said control member and said second control member conductive, said signal source being capable of varying the periods of time between the initiation of the conductive periods of the first said control member and of said second control member to vary the relative dwell times for said positive-going and negative-going components for said load.

15. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, a third member that can render the first said control member non-conductive when said second control member becomes conductive and that can render said second control member non-conductive when the first said control member becomes conductive, and a signal source that can selectively render the first said control member and said second control member conductive, said signal source being capable of varying the periods of time between the initiation of the conductive periods of the first said control member and of said second control member to vary the relative dwell times for said positive-going and negative-going components for said load, said signal source responding to a variable D.C. voltage to provide signals which can have the periods of time between the initiations thereof varied.

16. A control system which can provide different values of D.C. voltage for a load by providing positive-going and negative-going components for said load and by varying the relative dwell times for said positive-going and negative-going components and which comprises a control member that can be rendered conductive to provide positive-going components for said load, a second control member which can be rendered conductive to provide negative-going components for said load, a third member that can render the first said control member non-conductive when said second control member becomes conductive and that can render said second control member non-conductive when the first said control member becomes conductive, and a signal source that can selectively render the first said control member and said second control member conductive, said signal source being capable of varying the periods of time between the initiation of the conductive periods of the first said control member and of said second control member to vary the relative dwell times for said positive-going and negative-going components for said load, said signal source providing signals that have the sum of the widths thereof constant but which have the individual widths thereof variable.

17. A control system which can provide different values of D.C. voltage for a load by providing positive-going and negative-going components for said load and by varying the relative dwell times for said positive-going and negative-going components and which comprises controlled rectifiers which can selectively be rendered conductive and nonconductive, one of said controlled rectifiers applying a positive-going voltage to said load and another of said controlled recifiers applying a negative-going voltage to said load, a signal source that is adapted to provide signals that can alternately render said one controlled rectifier and said other controlled rectifier conductive, and a "hold out" circuit that keeps the first signal from said signal source from rendering said one or said other controlled rectifier conductive, said "hold out" circuit including a capacitor that can respond to a pulse of a predetermined polarity to forward bias a controlled rectifier while an inverse voltage is applied to said controlled rectifier and that can continue to forward said bias controlled rectifier as a second pulse renders said controlled rectifier conductive.

18. A control system which can provide different values of D.C. voltage for a load by providing positive-going and negative-going components for said load and by varying the relative dwell times for said positive-going and negative-going components and which comprises controlled rectifiers which can selectively be rendered conductive and non-conductive, one of said controlled rectifiers applying a positive-going voltage to said load and another of said controlled rectifiers applying a negative-going voltage to said load, a signal source that is adapted to provide signals that can alternately render said one controlled rectifier and said other controlled rectifier conductive, and a "hold out" circuit that keeps the first signal from said signal source from rendering said one or said other controlled rectifier conductive.

19. A plurality of control systems that are connected together and that are connectable to the same power source, each of said control systems having a selectively conductive element, having an energy-storing element and having a circuit that can "pump" energy from said energy-storing element back to said power source, at least one of said control systems being adapted to draw energy while another of said control systems is "pumping" energy back.

20. A plurality of control systems that are connected together and that are connectable to the same power source, each of said control systems having a controlled rectifier, an inductor, a capacitor, a transformer, and a rectifier that connects the secondary winding of said transformer to said power source, said controlled rectifier being adapted to be rendered conductive and to store energy in said inductor and in said capacitor, said energy being adapted to render said controlled rectifier non-conductive by applying an inverse voltage to it and to act through said transformer and said rectifier to pump energy back into said power source, at least one of said control systems being adapted to draw energy while another of said control systems is "pumping" energy back.

21. A plurality of control systems that are connected together and that are connectable to the same power source, each of said control systems having a controlled rectifier, an inductor, a capacitor, and a unidirectional element, said controlled rectifier being adapted to be rendered conductive and to store energy in a load to which said control system is connected, said energy being adapted during short dwell times of said control system to flow from said load and through said unidirectional element to another of said control systems that is drawing energy.

References Cited in the file of this patent

UNITED STATES PATENTS 2,961,594    Mah _____ Nov. 22, 1960
2,986,692    Fischer _____ May 30, 1961

OTHER REFERENCES

"Applications and Circuits Design Notes," published by Solid State Products Inc. September 1960; pages 22–26.

"G.E.S.C.R. Manual," published March 21, 1960; pages 142–143.

UNITED STATES PATENT OFFICE
CERTIFICATE OF CORRECTION

Patent No. 3,131,343                             April 28, 1964

Owen E. Reinert

It is hereby certified that error appears in the above numbered patent requiring correction and that the said Letters Patent should read as corrected below.

In the drawings, the conductors 135 of Figs. 1 and 13 should not cross the conductors 137. Instead, the conductors 135 should extend directly to the gates of the controlled rectifiers 142. Also, the conductors 137 of Figs. 1 and 13 should not cross the conductors 135; and, instead, should extend directly to the cathodes of those controlled rectifiers; column 3, line 55, for "than" read -- that --; column 5, line 17, for "the" read -- that --; column 7, line 11, for "152" read -- 142 --; column 12, line 74, for "176" read -- 178 --; column 14, line 28, for "controlled" read -- control --; column 16, line 27, for "176" read -- 178 --; column 18, line 51, for "176" read -- 178 --; column 20, line 12, for "As" read -- An --; column 21, line 16, after "have" insert -- the --; column 22, line 34, after "176" insert -- or 178 --; column 26, lines 51, 52 and 53, 55 and 57, for "elements", each occurrence, read -- members --; column 27, line 10, for "curernt" read -- current --.

Signed and sealed this 6th day of October 1964.

(SEAL)
Attest:

ERNEST W. SWIDER
Attesting Officer

EDWARD J. BRENNER
Commissioner of Patents